(12) United States Patent
Kato et al.

(10) Patent No.: US 10,937,415 B2
(45) Date of Patent: Mar. 2, 2021

(54) INFORMATION PROCESSING DEVICE AND INFORMATION PROCESSING METHOD FOR PRESENTING CHARACTER INFORMATION OBTAINED BY CONVERTING A VOICE

(71) Applicant: SONY CORPORATION, Tokyo (JP)

(72) Inventors: Ayumi Kato, Kanagawa (JP); Shinichi Kawano, Tokyo (JP); Yuhei Taki, Kanagawa (JP); Yusuke Nakagawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 125 days.

(21) Appl. No.: 16/089,132

(22) PCT Filed: Mar. 15, 2017

(86) PCT No.: PCT/JP2017/010406
§ 371 (c)(1),
(2) Date: Sep. 27, 2018

(87) PCT Pub. No.: WO2017/217046
PCT Pub. Date: Dec. 21, 2017

(65) Prior Publication Data
US 2019/0130901 A1 May 2, 2019

(30) Foreign Application Priority Data

Jun. 15, 2016 (JP) .............................. JP2016-118622

(51) Int. Cl.
*G10L 15/18* (2013.01)
*G10L 15/22* (2006.01)
(Continued)

(52) U.S. Cl.
CPC ............ *G10L 15/1815* (2013.01); *G06F 3/16* (2013.01); *G10L 15/07* (2013.01); *G10L 15/08* (2013.01); *G10L 15/187* (2013.01); *G10L 15/1807* (2013.01); *G10L 15/22* (2013.01); *G10L 15/26* (2013.01); *G10L 15/30* (2013.01);
(Continued)

(58) Field of Classification Search
CPC ....... G10L 15/065; G10L 15/07; G10L 15/08; G10L 15/1807; G10L 15/1815; G10L 2015/221; G10L 2015/226; G10L 2015/227; G10L 2015/228; G10L 15/26; G10L 15/265; G10L 15/28; G10L 15/30;
(Continued)

(56) References Cited

U.S. PATENT DOCUMENTS 5,953,701 A * 9/1999 Neti ...................... G10L 15/142
704/240
6,029,124 A * 2/2000 Gillick .................... G10L 15/08
704/200
(Continued)

*Primary Examiner* — Eric Yen
(74) *Attorney, Agent, or Firm* — Paratas Law Group, PLLC

(57) ABSTRACT

There is provided an information processing device to further improve the operability of user interfaces that use a voice as an input, the information processing device including: an acquisition unit configured to acquire context information in a period for collection of a voice; and a control unit configured to cause a predetermined output unit to present a candidate for character information obtained by converting the voice in a mode in accordance with the context information.

18 Claims, 24 Drawing Sheets

(51) Int. Cl.
  *G06F 3/16* (2006.01)
  *G10L 15/08* (2006.01)
  *G10L 21/0216* (2013.01)
  *G10L 15/26* (2006.01)
  *G10L 15/30* (2013.01)
  *G10L 15/07* (2013.01)
  *G10L 15/187* (2013.01)
  *G10L 25/84* (2013.01)

(52) U.S. Cl.
  CPC .......... *G10L 21/0216* (2013.01); *G10L 25/84* (2013.01); *G10L 2015/221* (2013.01); *G10L 2015/223* (2013.01); *G10L 2015/227* (2013.01); *G10L 2015/228* (2013.01)

(58) Field of Classification Search
  CPC ... G10L 21/0216; G10L 15/187; G10L 15/22; G10L 25/84
  See application file for complete search history.

(56) References Cited

U.S. PATENT DOCUMENTS

| | | | | |
|---|---|---|---|---|
| 6,253,177 B1* | 6/2001 | Lewis | G06F 3/16 | 704/235 |
| 6,275,820 B1* | 8/2001 | Navin-Chandra | G06F 16/951 | |
| 7,050,977 B1* | 5/2006 | Bennett | G06F 40/289 | 704/270.1 |
| 7,167,544 B1* | 1/2007 | Bauer | G10L 15/22 | 379/88.01 |
| 8,290,772 B1* | 10/2012 | Cohen | G06F 40/274 | 704/235 |
| 8,417,530 B1* | 4/2013 | Hayes | G06F 16/433 | 704/270.1 |
| 8,862,467 B1* | 10/2014 | Casado | G10L 15/22 | 704/235 |
| 8,914,286 B1* | 12/2014 | Secker-Walker | G10L 15/063 | 704/244 |
| 9,123,338 B1* | 9/2015 | Sanders | H04M 3/4936 | |
| 9,123,339 B1* | 9/2015 | Shaw | G10L 15/22 | |
| 9,466,293 B1* | 10/2016 | Gagnon | G10L 15/19 | |
| 9,672,827 B1* | 6/2017 | Jheeta | G06F 16/338 | |
| 2002/0046022 A1* | 4/2002 | Rose | G10L 15/20 | 704/231 |
| 2002/0049587 A1* | 4/2002 | Miyazawa | G10L 15/20 | 704/233 |
| 2002/0087306 A1* | 7/2002 | Lee | G10L 15/197 | 704/233 |
| 2002/0109723 A1* | 8/2002 | Yang | G06F 3/0481 | 715/764 |
| 2003/0154076 A1* | 8/2003 | Kemp | G10L 15/065 | 704/236 |
| 2003/0167167 A1* | 9/2003 | Gong | G10L 15/22 | 704/250 |
| 2004/0044516 A1* | 3/2004 | Kennewick | G10L 15/22 | 704/5 |
| 2004/0176953 A1* | 9/2004 | Coyle | G10L 15/22 | 704/253 |
| 2005/0021341 A1* | 1/2005 | Matsubara | G10L 15/07 | 704/275 |
| 2005/0049860 A1* | 3/2005 | Junqua | G10L 15/22 | 704/231 |
| 2005/0071159 A1* | 3/2005 | Boman | G10L 21/0208 | 704/233 |
| 2005/0080625 A1* | 4/2005 | Bennett | G10L 15/005 | 704/249 |
| 2005/0119883 A1* | 6/2005 | Miyazaki | G10L 15/142 | 704/231 |
| 2005/0131686 A1* | 6/2005 | Yamamoto | G10L 15/197 | 704/231 |
| 2005/0144162 A1* | 6/2005 | Liang | G06F 16/355 | |
| 2006/0053014 A1* | 3/2006 | Yoshizawa | G10L 15/06 | 704/256.4 |
| 2007/0106497 A1* | 5/2007 | Ramsey | G06F 40/35 | 704/9 |
| 2008/0195388 A1* | 8/2008 | Bower | G10L 15/19 | 704/243 |
| 2008/0228480 A1* | 9/2008 | Maegawa | G10L 15/07 | 704/235 |
| 2008/0275699 A1* | 11/2008 | Mozer | 704/231 | |
| 2008/0300871 A1* | 12/2008 | Gilbert | G10L 15/20 | 704/233 |
| 2009/0006088 A1* | 1/2009 | Gajic | G10L 15/07 | 704/233 |
| 2009/0089062 A1* | 4/2009 | Lu | G09B 5/04 | 704/270 |
| 2009/0164263 A1* | 6/2009 | Marlow | G06Q 10/06311 | 705/7.32 |
| 2010/0004927 A1* | 1/2010 | Endo | G10L 21/0208 | 704/226 |
| 2010/0324897 A1* | 12/2010 | Emori | G10L 15/04 | 704/243 |
| 2011/0153324 A1* | 6/2011 | Ballinger | G10L 15/005 | 704/235 |
| 2012/0035924 A1* | 2/2012 | Jitkoff | G10L 15/30 | 704/235 |
| 2012/0130716 A1* | 5/2012 | Kim | B25J 13/003 | 704/256.1 |
| 2012/0146891 A1* | 6/2012 | Kalinli | H04N 19/115 | 345/156 |
| 2012/0253804 A1* | 10/2012 | Sugiura | G10L 15/187 | 704/235 |
| 2012/0253812 A1* | 10/2012 | Kalinli | G10L 15/05 | 704/254 |
| 2012/0259554 A1* | 10/2012 | Chen | G06F 3/011 | 702/19 |
| 2013/0275130 A1* | 10/2013 | Nada | G10L 15/22 | 704/235 |
| 2014/0067406 A1* | 3/2014 | Hyatt | G06Q 10/10 | 705/2 |
| 2014/0278389 A1* | 9/2014 | Zurek | G10L 15/20 | 704/231 |
| 2014/0278401 A1* | 9/2014 | Ganong, III | G06F 16/685 | 704/235 |
| 2014/0279622 A1* | 9/2014 | Lamoureux | G06Q 50/01 | 705/319 |
| 2014/0303975 A1* | 10/2014 | Ohmura | G10L 15/22 | 704/235 |
| 2014/0358542 A1* | 12/2014 | Otani | G10L 15/22 | 704/246 |
| 2015/0120287 A1* | 4/2015 | Stern | G10L 15/183 | 704/231 |
| 2015/0281162 A1* | 10/2015 | Shen | G10L 15/1822 | 709/206 |
| 2015/0310865 A1* | 10/2015 | Fay | G10L 15/01 | 704/254 |
| 2015/0340040 A1* | 11/2015 | Mun | G10L 17/22 | 704/246 |
| 2015/0363393 A1* | 12/2015 | Williams | G10L 15/22 | 704/8 |
| 2015/0379985 A1* | 12/2015 | Wang | G10L 15/07 | 704/250 |
| 2016/0027452 A1* | 1/2016 | Kalinli-Akbacak | G10L 25/63 | 704/240 |
| 2016/0180839 A1* | 6/2016 | Tomita | G10L 15/02 | 704/240 |
| 2016/0253995 A1* | 9/2016 | Zhou | G10L 15/20 | 704/233 |
| 2016/0379630 A1* | 12/2016 | Assayag | G10L 15/22 | 704/235 |
| 2018/0034961 A1* | 2/2018 | Engelke | H04W 4/12 | |
| 2018/0174580 A1* | 6/2018 | Kim | G10L 15/197 | |

\* cited by examiner

FIG. 15
IN CASE IN WHICH SPEED OF UTTERANCE IS FAST
YAKUSHOUWA DOKO
UTTER "YAKUSHOUWA DOKO"
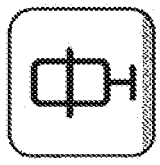

FIG. 21
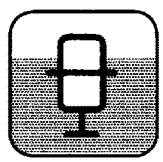 Work
Walk 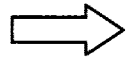  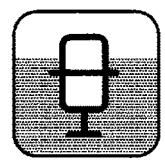 Walk    thin
Weak              Work in
                          Weak    on
UTTER "Walk in the park"         Walk CHANGES TO Work ON BASIS OF
                                 CO-OCCURRENCE PROBABILITY

FIG. 22
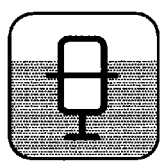 Work
Walk
Weak
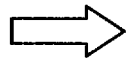
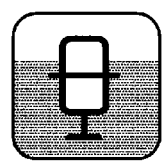 Walk   thin
Work in
Weak   on
UTTER "Walk in the park"          CONFIRM Walk

FIG. 23
IN CASE IN WHICH INFLUENCE OF NOISE IS SMALL
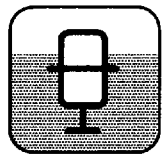
the　flower
Have a floor
　an　four
UTTER "Have a flower in my garden"
IN CASE IN WHICH INFLUENCE OF NOISE IS CONSIDERABLE
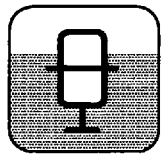
the　flower
Have a car
　an　cookie
UTTER "Have a flower in my garden"

INFORMATION PROCESSING DEVICE AND INFORMATION PROCESSING METHOD FOR PRESENTING CHARACTER INFORMATION OBTAINED BY CONVERTING A VOICE

CROSS REFERENCE TO PRIOR APPLICATION

This application is a National Stage Patent Application of PCT International Patent Application No. PCT/JP2017/010406 (filed on Mar. 15, 2017) under 35 U.S.C. § 371, which claims priority to Japanese Patent Application No. 2016-118622 (filed on Jun. 15, 2016), which are all hereby incorporated by reference in their entirety.

TECHNICAL FIELD

The present disclosure relates to an information processing device and an information processing method.

BACKGROUND ART

Interfaces of various schemes have been proposed as input interfaces for acquiring an input from users to control operations of so-called information processing devices such as personal computers (PCs) and game machines. Particularly in recent years, as so-called voice recognition technology and natural language processing technology has developed, user interfaces (UIs) that enable users to input various kinds of information through a voice have become widespread. Patent Literature 1, for example, discloses an example of a mechanism using a so-called voice recognition technology.

A voice input by a user can be converted into, for example, so-called character information and presented by applying the above-described voice recognition technology and natural language processing technology thereto. In addition, the character information resulting from the conversion of the voice can also be applied as an input to various kinds of control, for example, when the semantic content of the character information is recognized.

CITATION LIST

Patent Literature

Patent Literature 1: JP 2003-140691A

DISCLOSURE OF INVENTION

Technical Problem

However, user interfaces that can use a voice as an input can also be applied to information processing devices with so-called limited input interfaces, such as wearable terminals, and their applications are diverse. Under such circumstances, improvement in the operability of user interfaces that use a voice as an input has been desired particularly in recent years.

Therefore, the present disclosure proposes an information processing device and an information processing method that can further improve the operability of user interfaces that use a voice as an input.

Solution to Problem

According to the present disclosure, there is provided an information processing device including: an acquisition unit configured to acquire context information in a period for collection of a voice; and a control unit configured to cause a predetermined output unit to present a candidate for character information obtained by converting the voice in a mode in accordance with the context information.

In addition, according to the present disclosure, there is provided an information processing device including: a transmission unit configured to transmit context information in a period for collection of a voice acquired by a predetermined acquisition unit to an external device; and an output unit configured to present a candidate for character information obtained by converting the voice transmitted from an external device in a mode in accordance with the context information.

In addition, according to the present disclosure, there is provided an information processing method including, by a computer system: acquiring context information in a period for collection of a voice; and causing a predetermined output unit to present a candidate for character information obtained by converting the voice in a mode in accordance with the acquired context information.

In addition, according to the present disclosure, there is provided an information processing method including, by a computer system: transmitting context information in a period for collection of a voice acquired by a predetermined acquisition unit to an external device; and presenting a candidate for character information obtained by converting the voice transmitted from an external device in a mode in accordance with the context information.

Advantageous Effects of Invention

According to the present disclosure described above, an information processing device and an information processing method that can further improve the operability of user interfaces that use a voice as an input are provided.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 15 is an explanatory diagram for describing an example of a UI provided by the information processing system according to Modified example 1-3 of the embodiment.

FIG. 21 is an explanatory diagram for describing an example of control by the information processing system according to an embodiment.

FIG. 22 is an explanatory diagram for describing an example of a UI provided by an information processing system according to Modified example 2-1.

FIG. 23 is an explanatory diagram for describing an example of a UI provided by an information processing system according to Modified example 2-2.

MODE(S) FOR CARRYING OUT THE INVENTION

Figure 1:
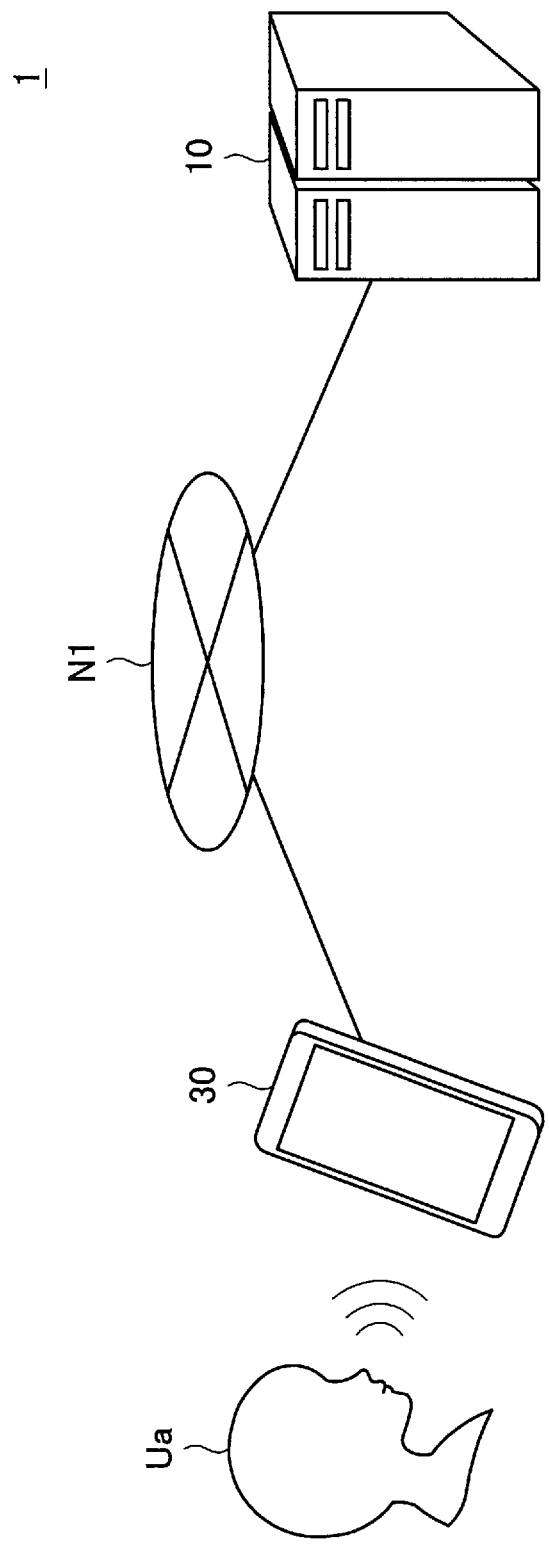
FIG. 1 is an explanatory diagram for describing an example of a schematic system configuration of an information processing system according to the present embodiment.

Hereinafter. (a) preferred embodiment (s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. System configuration
2. First Embodiment
2.1. Overview
2.2. Configuration
2.3. Process
2.4. Modified examples
2.4.1. Modified example 1-1: One example of UI for presenting correction candidates
2.4.2. Modified example 1-2: Control in accordance with state of input information based on sound collection results
2.4.3. Modified example 1-3: Control in accordance with mode of information input
2.5. Practical examples
2.6. Evaluation
3. Second Embodiment
3.1. Overview
3.2. Configuration
3.3. Process
3.4. Modified examples
3.4.1. Modified example 2-1: One example of interface for confirming recognition results
3.4.2. Modified example 2-2: Control of correction candidates in accordance with state or situation
3.5. Evaluation
4. Hardware configuration
5. Application examples
6. Conclusion

1. SYSTEM CONFIGURATION

First, a schematic configuration of an information processing system according to an embodiment of the present disclosure will be described with reference to FIG. 1. FIG. 1 is an explanatory diagram for describing an example of a schematic system configuration of an information processing system according to the present embodiment.

The information processing system according to the present embodiment includes an information processing device 10 and an input/output device 30 as illustrated in FIG. 1. The information processing device 10 and the input/output device 30 are configured to be capable of transmitting and receiving information to and from each other via a so-called network N1. Note that a type of the network N1 is not particularly limited. As a specific example, the network N1 may be configured as a so-called wireless network such as a network based on the Wi-Fi (registered trademark) standard. In addition, as another example, the network N1 may be configured as the Internet, a dedicated line, a local area network (LAN), a wide area network (WAN), or the like. In addition, the network N1 may include a plurality of networks and a part thereof may be configured as a wired network.

The input/output device 30 has a configuration for acquiring various types of input information and presenting various types of output information with respect to a user Ua holding the input/output device 30. In particular, the input/output device 30 according to the present embodiment is configured to have a sound collection unit, for example, a so-called microphone and to be capable of collecting a voice of the user Ua. The input/output device 30 may transmit, for example, a voice (sound) collected by the sound collection unit to the information processing device 10 via the network N1. In addition, the input/output device 30 may have a display unit such as a so-called liquid crystal display or an organic EL display and various output units such as a sound output unit like a so-called utterer, and may be configured to be capable of outputting information via the output units.

The input/output device 30 may acquire output information indicating results of a process using a voice transmitted to the information processing device 10 as an input from the information processing device 10 via the network N1 and present the output information acquired via the output units to the user Ua on the basis of the above-described configuration. As a more specific example, the input/output device 30 may acquire character information obtained by converting the voice from the information processing device 10 and present the character information to the user Ua by causing the display unit to display the acquired character information. In addition, as another example, the input/output device 30 may convert the character information acquired from the information processing device 10 into a voice on the basis of a text-to-speech (TTS) technology or the like, causing the sound output unit to output the converted voice, and thereby present the voice (i.e., a voice obtained by converting the character information) to the user Ua audibly.

In addition, the input/output device 30 may be configured to be capable of acquiring context information indicating various states or situations directly or indirectly. In this case, the input/output device 30 may transmit the acquired context information to the information processing device 10. Accordingly, the information processing device 10 can recognize the states or situations on the basis of the context information acquired from the input/output device 30.

Note that, as context information, for example, information indicating a state of an external environment of the input/output device 30 (further, an external environment of the user Ua) may be exemplified. As a specific example, the input/output device 30 may acquire information indicating an influence of noise (e.g., a volume of noise, a signal-to-noise ratio (SNR), etc.) as context information by acquiring sound collection results of ambient noise from the sound collection unit that collects sound from the external environment.

In addition, as context information, a state of a user (utterer) at the time of utterance, or information regarding a situation where the user is located may be exemplified. In a situation in which the user communicates with another user via the input/output device 30, for example, information regarding the partner of the communication (e.g., information indicating a relationship with the utterer, etc.) may be acquired as context information. In this case, for example, the input/output device 30 may specify the information regarding the partner of the communication on the basis of information of an external device with which communication has been established.

In addition, information regarding a situation in which information is input to various input devices may be acquired as context information. For example, a frequency of operations of the input device also helps a state of the user operating an input device such as a keyboard or a controller and a situation in which the user is located to be inferred.

In addition, as context information, information indicating a state of the input/output device 30 may be acquired. As a specific example, information regarding an application being executed by the input/output device 30 may be exemplified. Such context information also helps, for example, a state of the user operating the input/output device 30 and a situation where the user is located to be inferred.

In addition, the input/output device 30 may acquire a detection result of biological information such as a temperature, respiration, a heartbeat, and an amount of perspiration of the user from detection units such as various sensors as context information indicating states of the users.

In addition, information regarding a mode of speech such as a speed of speech or a volume of a voice may be acquired as context information. For example, the input/output device 30 may recognize a speed, a volume, or the like of speech on the basis of a voice collection result. In addition, on the basis of a quality of the collected voice, information indicating an attribute (e.g., sex or age) of the user uttering the voice (i.e., information indicating who is uttering) can also be acquired as context information. In addition, on the basis of the voice collection result, information regarding a state of input information such as information regarding a length of the uttered voice or information regarding a length of character information obtained by converting the voice (i.e., a length of a character string uttered by the user) can also be acquired as context information. Of course, information to be input is not limited only to a voice, and context information regarding various states or situations of other types of input information may be acquired. As a specific example, information indicating an input speed of information with respect to an input device such as a keyboard or a controller, information indicating strength of input (e.g., pressure), and the like may be acquired as context information. In addition, the input/output device 30 may acquire a voice collection result as context information for indirectly acquiring information indicating the above-described various states or situations.

Note that a timing at which the input/output device 30 acquires the above-described context information is not particularly limited. For example, the input/output device 30 may acquire context information in a case in which the user utters (i.e., a case in which a voice is collected). As a more specific example, in a case in which a voice uttered by the user starts to be collected on the basis of a predetermined operation, as in so-called push-to-talk (PTT), the input/output device 30 may acquire context information on the basis of the detection of the operation. With this configuration, the input/output device 30 can acquire context information regarding various states or situations at a timing at which the user starts uttering (i.e., a timing at which collection of a voice is started). In addition, the input/output device 30 may successively acquire context information during a period in which speech of the user is being detected (i.e., during a period in which collection of a voice continues).

In addition, the input/output device 30 may acquire context information regarding the state or situation immediately before the start of utterance in a case in which the user has started uttering (i.e., in a case in which collection of a voice has been started). As a specific example, a state of the user or a situation in which the user is located at the time of utterance can also be inferred from context information indicating an operation situation with respect to another input device of the user in the period immediately before the user starts uttering. In such a case, for example, the input/output device 30 may successively monitor a predetermined state or situation and acquire context information for the period on the basis of monitoring results before and after a detection timing of a predetermined event (e.g., a start of utterance by the user) using detection of the event as a trigger. With this configuration, in a case in which the start of utterance by the user is detected, for example, the input/output device 30 can acquire information regarding various states or situations in a period of several seconds (e.g., about 10 seconds) before and after the start of the utterance as context information regarding the period of the utterance.

Note that, in a case in which a "period for collection of a voice" is used in the present disclosure, the period is assumed to include the period immediately before collection of the voice is started, without limitation to only the period in which the voice is collected. Likewise, in a case in which a "period for utterance" is used, the period is assumed to include the period immediately before a voice is uttered, without limitation to only a voice uttered period. Note that, in general, if context information for the period of about 10 seconds before and after the start of collection of a voice can be acquired, a state of the user who uttered the voice or a situation in which the user is located can be inferred. Of course, it is needless to say that a period for which context information is acquired may be changed in accordance with a use case.

Next, the information processing device 10 will be described. The information processing device 10 acquires collection results of a voice (sound) from the input/output device 30 and executes various processes using the acquired voice as input information. Specifically, in a case in which a collection result of sound is acquired from the input/output device 30, the information processing device 10 may detect a voice included in the sound or extract a voice from the sound on the basis of the detection result. In addition, the information processing device 10 may convert an acquired voice into character information by performing a voice recognition process (so-called sound analysis) on the voice. In addition, at this time, the information processing device 10 may convert the character information obtained by converting the voice into character information of which the semantic content is taken into account (e.g., a sentence of a combination of Chinese characters and Japanese characters, etc.) on the basis of natural language processing (so-called language analysis) such as morphemic analysis, syntactic analysis, and semantic analysis. In addition, the information processing device 10 may execute a function instructed through the voice by recognizing the semantic content of the character information obtained by converting the voice.

In addition, the information processing device 10 may transmit execution results of various processes using voice collection results as input information to the input/output device 30 via the network N1. As a specific example, in a case in which a voice is detected in a voice collection result, the information processing device 10 may report the detection result to the input/output device 30. In addition, the information processing device 10 may transmit character information obtained by converting the voice to the input/output device 30 on the basis of a result of the voice recognition process or natural language processing on the voice collection result. In addition, at this time, the information processing device 10 may cause the input/output device 30 to output the character information obtained by converting the voice via a predetermined output unit by controlling an operation of the input/output device 30.

In addition, the information processing device 10 may acquire the above-described context information from the input/output device 30. Accordingly, the information processing device 10 can recognize various states or situations such as a state of a surrounding environment of the input/output device 30, a state of the user holding the input/output device 30, or the like. In addition, in this case, the information processing device 10 may control various processes in accordance with recognition results of the various states or situations. As a specific example, the information processing device 10 may control a presentation mode of character information obtained by converting a voice in accordance with acquired context information (i.e., in accordance with a state or a situation indicated by the context information).

Note that the above-described system configuration is merely an example, and the embodiment is not necessarily limited only to the example illustrated in FIG. 1. As a specific example, the information processing device 10 may include a plurality of devices (e.g., servers, etc.) cooperating with each other. In addition, as another example, the information processing device 10 and the input/output device 30 may be configured in an integrated manner.

The schematic configuration of the information processing system according to the embodiment of the present disclosure has been described above with reference to FIG. 1. Note that each of various embodiments of the information processing system according to the present disclosure will be described below.

2. FIRST EMBODIMENT

2.1. Overview

First, an information processing system according to a first embodiment of the present disclosure will be described. As described above, users can input character information through a voice without using an input device such as a keyboard by applying, for example, a voice recognition technology or a natural language processing technology. On the other hand, it is hard to say that the accuracy of a voice recognition process or natural language processing is high at all times, and thus a case in which a voice may be erroneously recognized can be assumed.

As a specific example, in a case in which a voice is recognized and converted into character information, an error that occurs during sound analysis or an error that occurs during language analysis can be assumed. As an error that occurs during sound analysis, for example, an error caused by ambiguity of voice input may be exemplified. As a specific example, a case in which a word/phrase input through a voice is recognized as another word/phrase with similar pronunciation due to erroneously recognized pronunciation of the voice may be exemplified. In addition, as an error that occurs during language analysis, for example, an error made in conversion of homonyms, may be exemplified. As a specific example, a case in which, even if pronunciation of a voice is correctly recognized in a situation in which a voice uttered in the Japanese language is recognized, the pronunciation is converted into a word/phrase having a different meaning from the one originally intended by the user in a case in which character information indicating the pronunciation (e.g., a sentence indicated by Hiragana) is converted into character information of a combination of Chinese characters and Japanese characters, may be exemplified.

If an error occurs in the recognition result of the voice in the above situation, a UI on which the error can be corrected with a simpler operation is required. As a UI satisfying this requirement, for example, a UI on which correction candidates for an erroneously recognized word/phrase are selectably presented may be exemplified. With such a UI, a user can select his or her desired candidate from the presented correction candidates, and thereby can correct the erroneously recognized word/phrase.

Meanwhile, in a case in which a voice is recognized and converted into character information, an error that occurs during voice analysis, an error that occurs during language analysis, and the like are assumed as described above. Thus, in a case in which correction candidates are simply presented considering every error that can occur in every stage, the number of correction candidates increases, and thus a burden of checking the correction candidates imposed on the user increases, which may rather impair the operability.

Considering the above-described situation, the information processing system according to the present embodiment presents correction candidates in a mode in accordance with various states or situations of a period for collection of a voice on the basis of context information acquired in the period. As a specific example, an example in which a mode in which correction candidates are presented in accordance with a state of an environment in which a voice is collected will be described below.

In a quiet environment due to there being little influence from ambient noise, for example, a likelihood of occurrence of an error of recognizing a word/phrase as another word/phrase with similar pronunciation tends to be high. Thus, the information processing system according to the present embodiment, for example, preferentially presents correction candidates with similar pronunciation as correction candidates for character information obtained by converting a voice in an environment with little influence of noise.

Figure 2:
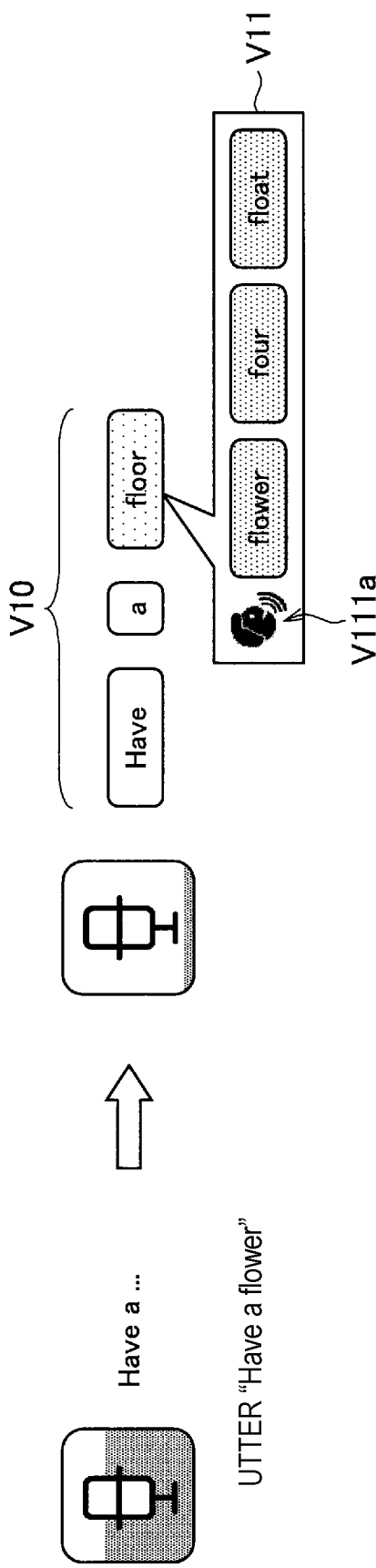
FIG. 2 is an explanatory diagram for describing an example of a UI provided by an information processing system according to a first embodiment of the present disclosure.

FIG. 2 is an explanatory diagram for describing an example of a UI provided by the information processing system according to the present embodiment, illustrating, for example, an example of a presentation mode of character information obtained by converting a voice in a situation with little influence of noise. Specifically, in the example illustrated in FIG. 2, a user utters "have a flower," and the information processing system presents character information V10 of "have a floor" to the user as the recognition result of the voice uttered by the user. In addition, the information processing system receives selection of an erroneously recognized word/phrase "floor" included in the presented character information V10 from the user and presents display information V11 in which correction candidates for the word/phrase are presented.

In the example illustrated in FIG. 2, the information processing system recognizes that the voice collection environment has little influence of noise on the basis of context information acquired in the period for collection of a voice. In addition, the information processing system controls the level of priority of each of the candidates such that other word/phrase candidates (e.g., "flower," "four," "float," etc.) with similar pronunciation to "floor" have higher levels of priority on the basis of the recognition result, and presents at least one correction candidate to the user in accordance with the control result of the levels of priority. In addition, at this time, the information processing system may also present display information V111a such as an icon indicating that correction candidates with more similar pronunciation are preferentially presented together.

Figure 3:
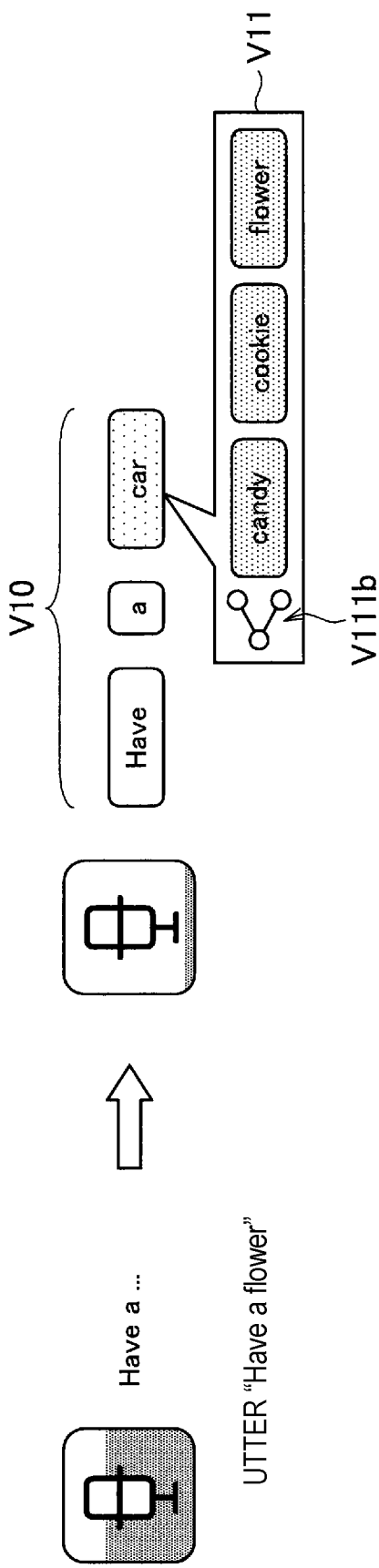
FIG. 3 is an explanatory diagram for describing another example of the UI provided by the information processing system according to the embodiment.

In addition, FIG. 3 is an explanatory diagram for describing another example of the UI provided by the information processing system according to the present embodiment as another example, illustrating an example of a presentation mode of character information obtained by converting a voice in a situation in which an influence of noise is considerable. Note that, in the example illustrated in FIG. 3, a user utters "have a flower," and the information processing system presents character information V10 of "have a car" to the user as the recognition result of the voice uttered by the user. In addition, the information processing system receives selection of the erroneously recognized word/ phrase "car" included in the presented character information V10 from the user and presents display information V11 in which correction candidates for the word/phrase are presented.

In the example illustrated in FIG. 3, the information processing system recognizes that the voice collection environment has a considerable influence of noise on the basis of context information acquired in the period for collection of a voice. In addition, the information processing system controls the level of priority of each of the candidates on the basis of the co-occurrence relationship with the word/phrase "have" uttered together therewith, as correction candidates for the word/phrase "car" on the basis of the recognition result. In the example illustrated in FIG. 3, for example, the information processing system controls the level of priority of each candidate such that word/phrase candidates having a high likelihood of being used together with the word/ phrase "have" (e.g., "candy," "cookie," "flower," etc.) have higher levels of priority. Then, the information processing system presents at least some of the correction candidates to the user in accordance with the control result of the levels of priority. In addition, at this time, the information processing system may also present display information V111b such as an icon indicating that the correction candidates are presented on the basis of the co-occurrence relationship between the word/phrase to be corrected and other words/ phrases.

As described above, the information processing system according to the present embodiment presents the candidates for the character information obtained by converting the collected voice in the mode in accordance with the context information acquired in the period for collection of a voice. More specifically, even if an error occurs in a voice recognition result, the information processing system according to the present embodiment can dynamically control the level of priority of each correction candidate in accordance with the state or situation of each occasion, and present more preferable correction candidates to the user on the basis of the control result of the level of priority. Since there is a higher likelihood of a candidate indicating the originally intended content being specified from the limited correction candidates with this configuration, the user can correct the voice recognition result through a simple operation, without a tiresome operation of checking many candidates.

The overview of the information processing system according to the first embodiment of the present disclosure has been described above. Note that the information processing system according to the present embodiment will be further described in detail below.

2.2. Configuration

Figure 4:
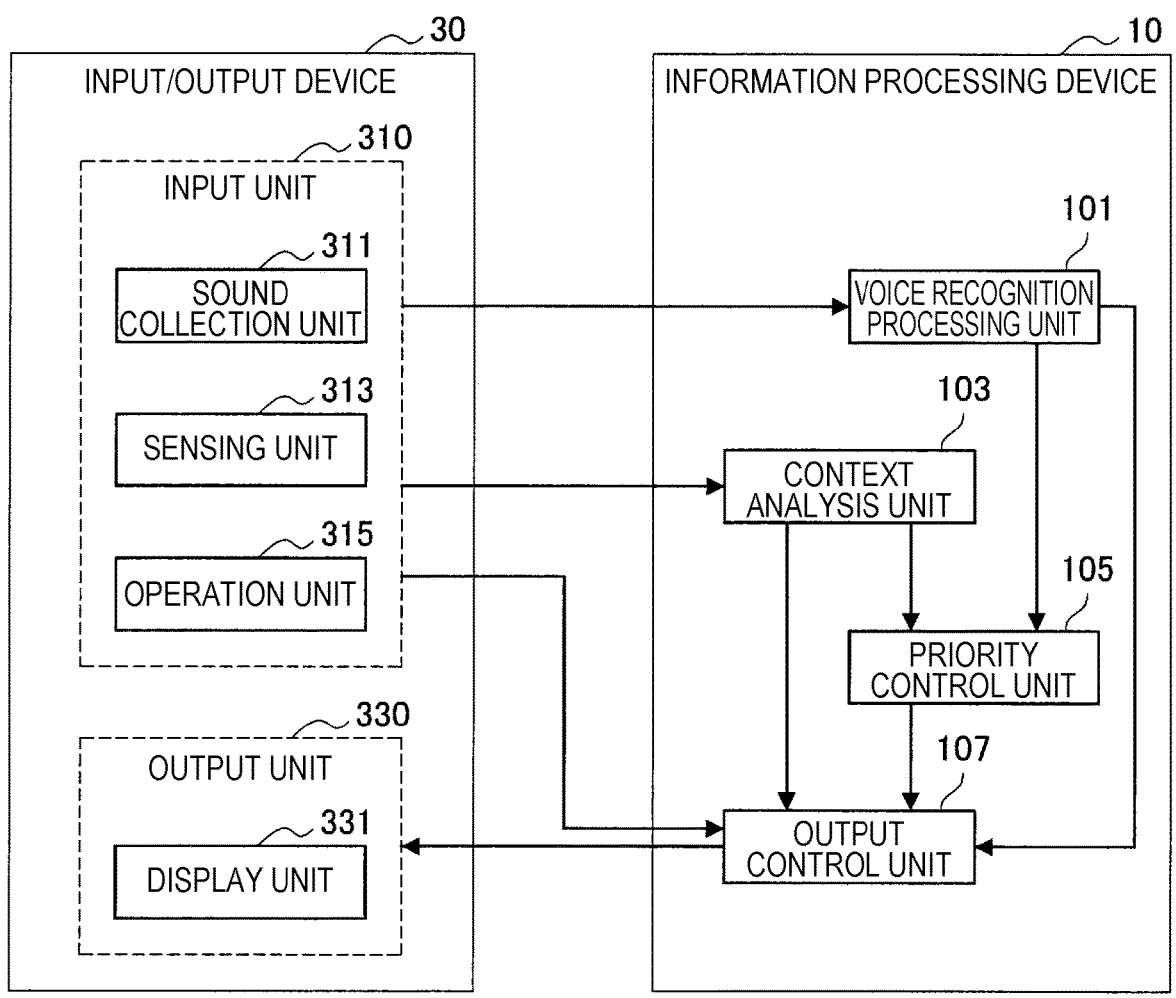
FIG. 4 is a block diagram illustrating an example of a functional configuration of the information processing system according to the embodiment.

Next, an example of a functional configuration of the information processing system according to the present embodiment will be described with reference to FIG. 4, particularly focusing on the configurations of the information processing device 10 and the input/output device 30 illustrated in FIG. 1. FIG. 4 is a block diagram illustrating an example of a functional configuration of the information processing system according to the present embodiment.

Note that, for the sake of easier understanding of the configurations of the information processing device 10 and the input/output device 30, a communication unit of the information processing device 10 and the input/output device 30 for transmitting and receiving information via a network is not illustrated in the example illustrated in FIG. 4. Note that a configuration of the communication unit may be appropriately changed in accordance with the type of network. In a case in which the network is a wireless network, for example, the communication unit may include a baseband (BB) processor, an RF circuit, and the like. Note that, in the following description, in a case in which each internal configuration of the information processing device 10 and the input/output device 30 performs transmission and reception of information with an external device via the network, the transmission and reception of information are assumed to be performed via the communication unit even in a case in which there is no particular description thereof.

First, a configuration of the input/output device 30 will be described. The input/output device 30 includes an input unit 310 and an output unit 330 as illustrated in FIG. 4. The input unit 310 includes, for example, a sound collection unit 311, a sensing unit 313, and an operation unit 315. In addition, the output unit 330 includes, for example, a display unit 331.

The sound collection unit 311 includes a sound collection device such as a so-called microphone, and collects sound such as a voice of a user. A sound signal based on a sound collection result from the sound collection unit 311 is, for example, transmitted to the information processing device 10 via the network.

The sensing unit 313 has a configuration for acquiring context information indicating various states or situations. For example, the sensing unit 313 may include various sensors and acquire information indicating states of a surrounding environment from the sensors as context information. In addition, the sensing unit 313 may include a sound collection unit that collects sound of an external environment and acquire the sound collection result from the sound collection unit as context information indicating an influence of noise. In addition, the sensing unit 313 may also acquire context information from various devices provided outside the input/output device 30. As a specific example, the sensing unit 313 may acquire context information indicating biological information of a user from various sensors installed on the body of the user. Note that context information acquired by the sensing unit 313 is, for example, transmitted to the information processing device 10 via the network.

The operation unit 315 has a configuration for receiving input operations from a user and includes input devices, for example, buttons, a touch panel, a so-called pointing device, or the like. As illustrated in FIGS. 2 and 3, for example, a correction item of character information obtained by converting a voice may be selected on the basis of an operation via the operation unit 315. That is, the input/output device 30 may recognize an operation target (i.e., a selection target) on the basis of the content of an operation input by the user with respect to the operation unit 315. In addition, an operation for starting voice collection such as so-called PTT may be performed via the operation unit 315.

The display unit 331 includes a display device such as a so-called liquid crystal display or organic EL display, and presents information to a user by displaying various kinds of display information. The display unit 331 presents output information transmitted from the information processing device 10 to a user by, for example, displaying the output information as display information. In addition, at this time, the display unit 331 may display output information transmitted from the information processing device 10 as display information in a mode designated by the information processing device 10.

Note that the above-described configurations included in the input unit 310 and the output unit 330 are merely examples, and a configuration other than the above-described configurations may be included in accordance with a use application of the input/output device 30. As a specific example, the output unit 330 may include a sound output unit including a sound device such as a so-called utterer. With this configuration, the input/output device 30 can also output information transmitted from the information processing device 10 as, for example, a voice.

Next, configurations of the information processing device 10 will be described. The information processing device 10 includes a voice recognition processing unit 101, a context analysis unit 103, a priority control unit 105, and an output control unit 107 as illustrated in FIG. 4.

The voice recognition processing unit 101 acquires a sound signal based on a sound collection result from the input unit 310 (the sound collection unit 311) of the input/output device 30, performs sound analysis and language analysis on the acquired sound signal, and thereby converts a voice included in the sound into character information. Specifically, the voice recognition processing unit 101 extracts a voice signal included in the sound signal on the basis of a technology such as Voice Activity Detection (VAD). In addition, the voice recognition processing unit 101 performs a voice recognition process (sound analysis) on the extracted voice signal and thereby converts pronunciation of the voice into character information. In addition, the voice recognition processing unit 101 may perform natural language processing (language analysis) on the character information obtained as the result of the voice recognition process and thereby convert the character information into character information of which semantic content is taken into account.

Note that results of the voice recognition process and natural language processing are not necessarily uniquely specified. Thus, in a case in which a voice is converted into character information, the voice recognition processing unit 101 may specify one or more other candidates (i.e., correction candidates) for at least parts of words/phrases included in the character information. As a specific example, with respect to at least parts of words/phrases included in character information obtained by converting a voice, the voice recognition processing unit 101 may specify other candidates with similar pronunciation for the word/phrase. In addition, as another example, with respect to at least parts of words/phrases included in character information obtained by converting a voice, the voice recognition processing unit 101 may specify other candidates for the word/phrase on the basis of the co-occurrence relationship with other words/phrases.

Then, the voice recognition processing unit 101 outputs the character information obtained by converting the voice and information indicating other candidates for a word/phrase included in the character information to the output control unit 107 and the priority control unit 105 on the basis of the results of the voice recognition process and natural language processing with respect to the acquired sound signal.

The context analysis unit 103 acquires context information from the input/output device 30 and recognizes various states or situations by analyzing the acquired context information. As a specific example, the context analysis unit 103 may acquire a sound collection result of a surrounding environment of the input/output device 30 as context information. In this case, for example, the context analysis unit 103 may recognize the magnitude of an influence of noise (e.g., the volume of noise, etc.) in the sound collection environment on the basis of the sound collection result.

When the noise level is 60 dB or higher, this tends to be perceived as noisy in general. Note that the volume of a "normal conversation," a "chime," and an "inside of a car running at 40 kilometers per hour" corresponds to about 60 dB. In addition, when the noise level is 80 dB or higher, this tends to be perceived as very noisy. Note that the volume of an "inside of a subway (with doors open)," and "sound of a piano" corresponds to about 80 dB. Thus, when the volume of noise is 60 dB or higher, for example, the context analysis unit 103 may recognize an environment with a considerable influence of noise (i.e., a noisy environment).

In addition, as another example, the context analysis unit 103 may acquire a sound signal based on a collection result of a voice uttered by a user as context information. In this case, for example, the context analysis unit 103 may recognize a speed of speech, the volume of a voice, and the like on the basis of the result of sound analysis (e.g., the voice recognition process) with respect to the sound signal. Note that the context analysis unit 103 may acquire the result of the sound analysis with respect to the sound signal from the voice recognition processing unit 101.

In addition, as another example, the context analysis unit 103 may acquire the results of the sound analysis and language analysis with respect to the sound signal based on the collection result of the voice uttered by the user as context information. In this case, for example, the context analysis unit 103 may recognize the length of the voice uttered by the user, the length of the character string uttered by the user (i.e., the length of the character information obtained by converting the voice), or the like on the basis of the results of the sound analysis and language analysis with respect to the sound signal.

In this way, the context analysis unit 103 recognizes various states or situations based on the acquired context information and outputs information indicating the recognition result to the output control unit 107 and the priority control unit 105.

The priority control unit 105 acquires the character information obtained by converting the voice and the information indicating other candidates for the word/phrase included in the character information as the results of the sound analysis and language analysis with respect to the acquired sound signal from the voice recognition processing unit 101. In addition, the priority control unit 105 acquires information indicating the recognition results of the various states or situations based on the acquired context information from the context analysis unit 103. The priority control unit 105 may control the levels of priority of other candidates of the word/phrase included in the character information obtained by converting the voice based on algorithms varying according to the recognition results of the various states or situations. Note that examples of a priority control method are as described above with reference to FIGS. 2 and 3. In addition, examples thereof will be described below as other modified examples and practical examples, in addition to the examples described in FIGS. 2 and 3. In addition, the priority control unit 105 outputs information indicating a control result of the levels of priority of other candidates for the word/phrase included in the character information obtained by converting the voice to the output control unit 107.

The output control unit 107 acquires the character information obtained by converting the voice and the information indicating other candidates for the word/phrase included in the character information from the voice recognition processing unit 101. At this time, the output control unit 107 may present the acquired character information to the input/output device 30. Accordingly, the user holding the input/output device 30 can check the recognition result of the voice uttered by himself or herself via the output unit 330 (e.g., the display unit 331) of the input/output device 30.

In addition, the output control unit 107 may cause the input/output device 30 to present the character information such that each word/phrase included in the character information obtained by converting the voice can be selected on the basis of the results of the sound analysis and language analysis. In this case, for example, the output control unit 107 recognizes a word/phrase selected by the user among words/phrases included in the character information obtained by converting the voice on the basis of the result of an input operation via the input unit 310 (e.g., the operation unit 335) of the input/output device 30. In addition, the output control unit 107 may cause the input/output device 30 to present other candidates for the word/phrase selected by the user (i.e., a word/phrase to be corrected) as correction candidates, for example, as illustrated in FIGS. 2 and 3.

Figure 5:
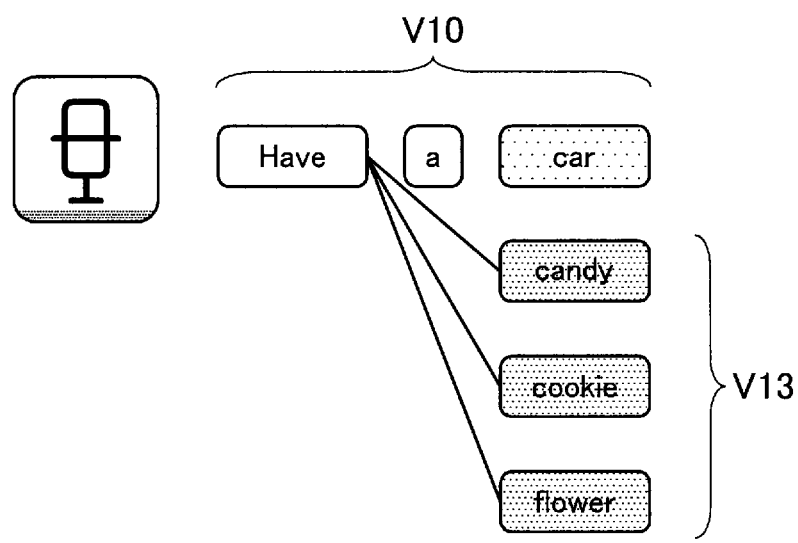
FIG. 5 is an explanatory diagram for describing another example of the UI provided by the information processing system according to the embodiment.

In addition, at this time, the output control unit 107 may acquire the information indicating the recognition results of the various states or situations based on the acquired context information from the context analysis unit 103 and control the presentation mode of the correction candidates in accordance with the recognition results. For example, FIG. 5 is an explanatory diagram for describing another example of the UI presented by the information processing system according to the present embodiment. In the example illustrated in FIG. 5, in a case in which correction candidates are presented on the basis of the co-occurrence relationship between the word/phrase to be corrected and other words/phrases, the correction candidates are presented in a mode different from the case in which correction candidates with similar pronunciation are presented (e.g., FIG. 2). Specifically, in the example of the UI illustrated in FIG. 5, display information V13 in which correction candidates for the word/phrase to be corrected are presented together with information indicating the co-occurrence relationship between the correction candidates and other words/phrases is presented.

Figure 6:
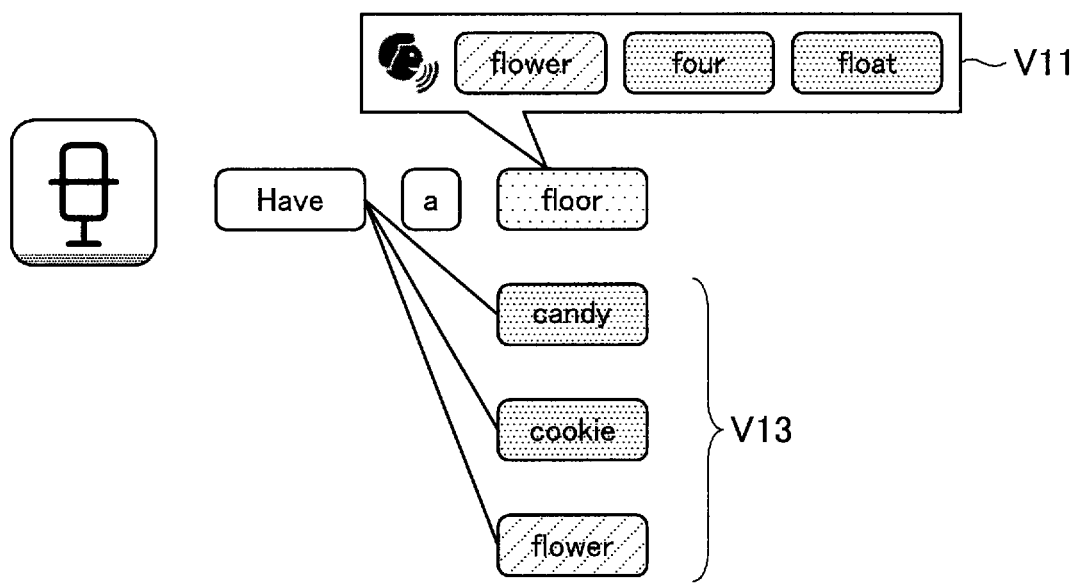
FIG. 6 is an explanatory diagram for describing another example of the UI provided by the information processing system according to the embodiment.

In addition, the output control unit 107 may present a combination of a UI of a case in which correction candidates with similar pronunciation are presented as illustrated in FIG. 2 and a UI of a case in which correction candidates are presented on the basis of the co-occurrence relationship between the word/phrase to be corrected and other words/phrases as illustrated in FIG. 5 in accordance with a state or situation. For example, FIG. 6 is an explanatory diagram for describing another example of the UI presented by the information processing system according to the present embodiment, illustrating an example of a case in which a combination of the UI illustrated in FIG. 2 and the UI illustrated in FIG. 5 is presented. Specifically, the example is not necessarily limited to only a case in which states or situations can be specified alternatively. Considering such a situation, the output control unit 107 may present correction candidates of which the levels of priority are controlled on the basis of different algorithms by combining a corresponding UI with each of the algorithm, as illustrated in FIG. 6. Note that, at this time, the output control unit 107 may emphasize and display a correction candidate commonly presented in the correction candidates presented for each of algorithms. In the example of FIG. 6, for example, the candidate indicated as "flower" is commonly presented in the correction candidates presented as the display information V11 and the correction candidates presented as the display information V13. Thus, the candidate indicated as "flower" is emphasized among the correction candidates presented in each of the display information V11 and V13 in the example illustrated in FIG. 6.

In addition, the output control unit 107 may acquire information indicating the control result of the levels of priority of other candidates for the word/phrase included in the character information obtained by converting the voice from the priority control unit 105. In this case, for example, the output control unit 107 may cause the input/output device 30 to present other candidates for the word/phrase selected by the user on the basis of the control result of the levels of priority as correction candidates as illustrated in FIGS. 2 and 3.

Note that, in a case in which designation of a correction candidate is received via the input unit 310 of the input/output device 30, the output control unit 107 confirms the designated correction candidate as a correction candidate for the corresponding word/phrase included in the character information obtained by converting the voice. In this case, the output control unit 107 may replace the corresponding word/phrase included in the character information obtained by converting the voice with the designated correction candidate, and then cause the input/output device 30 to present the character information that has undergone the replacement.

Note that the functional configuration of the information processing system illustrated in FIG. 4 is merely an example, and a functional configuration of the information processing system is not necessarily limited only to the example illustrated in FIG. 4 as long as the function of each of the above-described configurations can be realized. For example, part of the configuration of the information processing device 10 may be provided outside the information processing device 10. As a specific example, a configuration corresponding to the output control unit 107 may be provided on the input-output device 30 side. In this case, the input/output device 30 may acquire the character information obtained by converting a voice, the information indicating other candidates for the word/phrase included in the character information, and information indicating the control result of the levels of priority of the other candidates from the information processing device 10. In addition, at least part of the configurations included in each of the input unit 310 and the output unit 330 may be provided outside the input/output device 30. In addition, the input/output device 30 and the information processing device 10 may be provided in an integrated manner as described above.

The example of the functional configuration of the information processing system according to the present embodiment has been described above with reference to FIG. 4, particularly focusing on the configurations of the information processing device 10 and the input/output device 30 illustrated in FIG. 1.

2.3. Process

Figure 7:
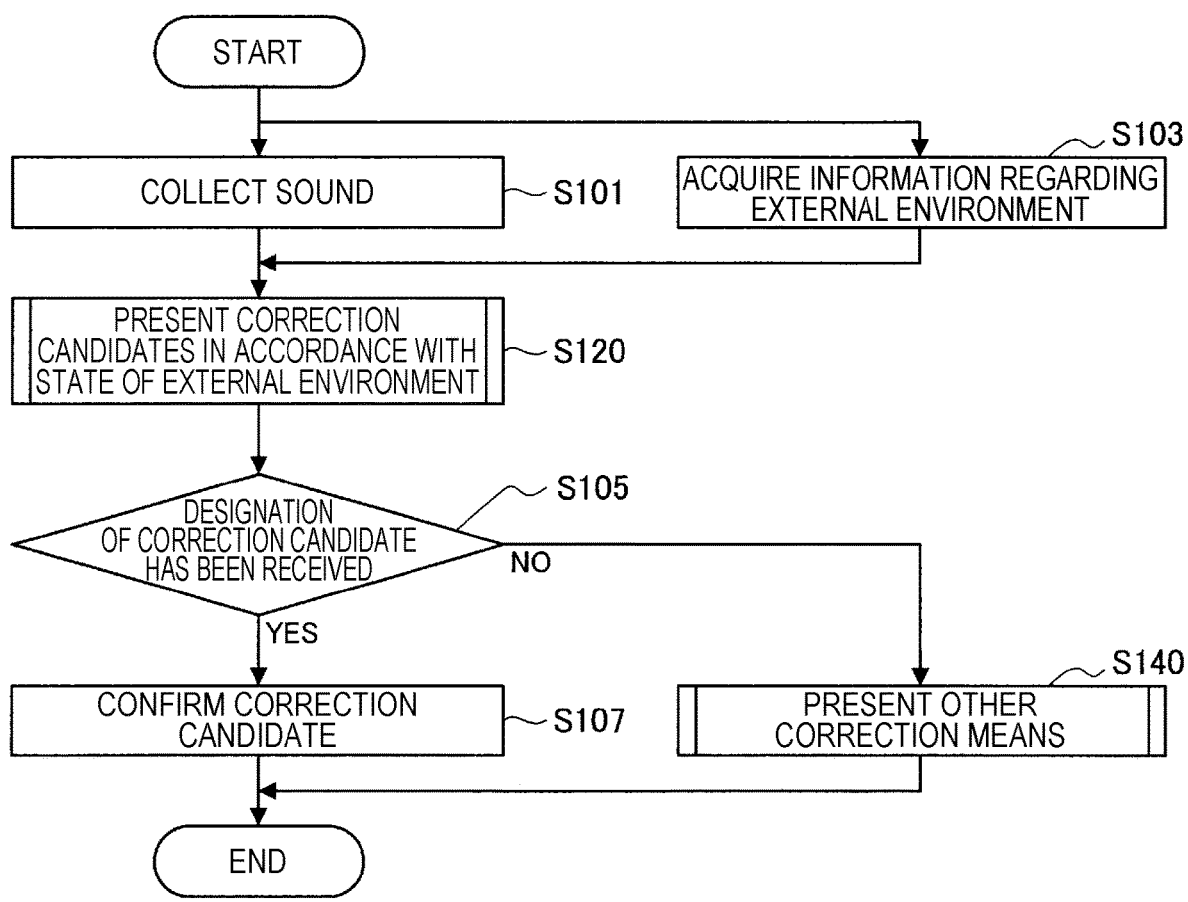
FIG. 7 is a flowchart illustrating an example of a flow of a series of processes of the information processing system according to the embodiment.
Figure 8:
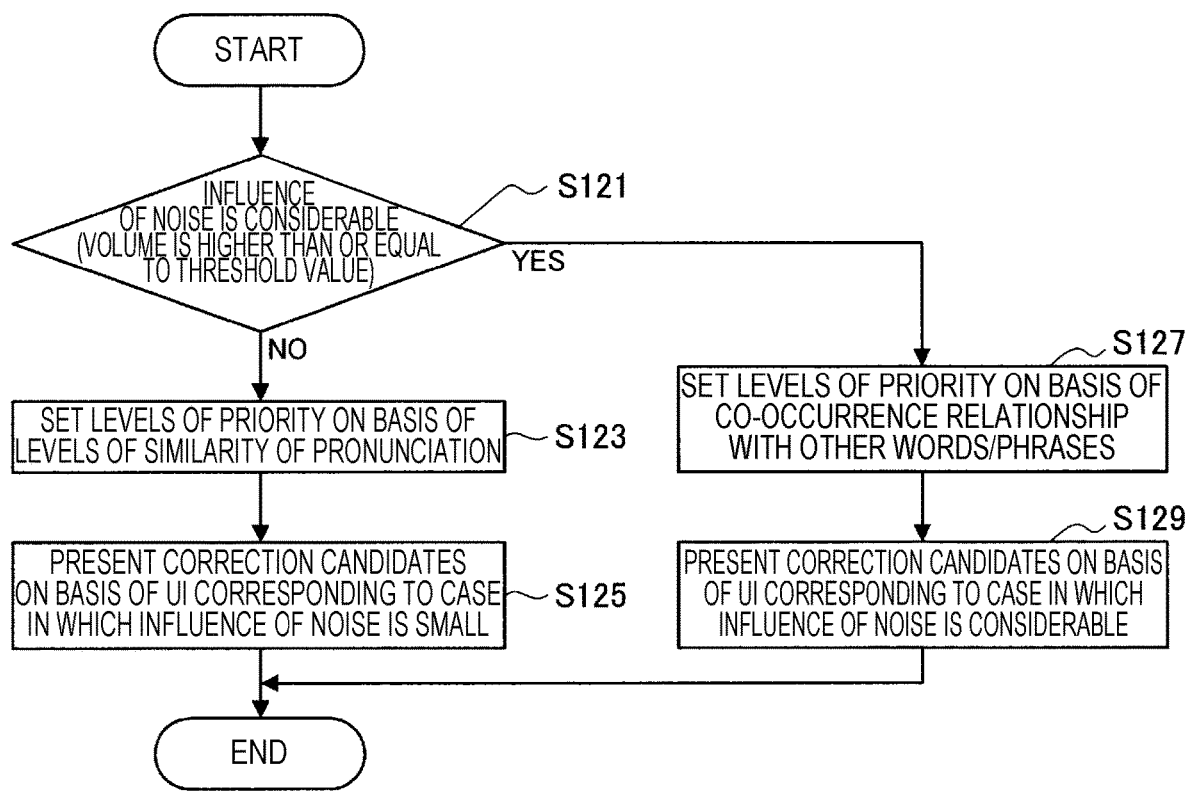
FIG. 8 is a flowchart illustrating an example of a flow of a series of processes of the information processing system according to the embodiment.

Next, an example of a flow of a series of processes of the information processing system according to the present embodiment will be described with reference to FIGS. 7 and 8. FIGS. 7 and 8 are flowcharts illustrating the example of the flow of the series of processes of the information processing system according to the present embodiment. Note that, in this description, a case in which candidates for character information obtained by converting a collected voice are presented on the basis of context information indicating an influence of noise from an external environment will be particularly focused on.

First, description will be provided with reference to FIG. 7 focusing on a flow of an overall process. The input/output device 30 (the sound collection unit 311) collects sound such as a voice of a user and transmits a sound signal based on the sound collection result to the information processing device 10 via the network (S101) as illustrated in FIG. 7. In addition, the input/output device 30 (the sensing unit 313) collects sound (noise) of the surrounding environment as context information regarding a state of the external environment and transmits the sound signal indicating the sound collection result to the information processing device 10 as context information indicating the influence of the noise via the network (S103).

The information processing device 10 (the voice recognition processing unit 101) acquires the sound signal based on the sound collection result from the input/output device 30, performs sound analysis and language analysis on the acquired sound signal, and thereby converts a voice included in the sound into character information. In addition, at this time, with respect to at least parts of words/phrases included in the character information obtained by converting the voice, the information processing device 10 may specify one or more other candidates (i.e., correction candidates) for the word/phrase. In addition, the information processing device 10 (the context analysis unit 103) acquires the context information from the input/output device 30 and recognizes various states or situations by analyzing the acquired context information. Next, the information processing device 10 (the priority control unit 105) controls the levels of priority of the other candidates for the word/phrase included in the character information obtained by converting the voice in accordance with the recognition results of the various states or situations based on the acquired context information. In addition, the information processing device 10 (the output control unit 107) causes the input/output device 30 to present the character information obtained by converting the voice such that each of words/phrases included in the character information can be selected. Then, the information processing device 10 receives selection of each word/phrase included in the character information obtained by converting the voice and causes the input/output device 30 to display other candidates for the selected word/phrase in association with the word/phrase on the basis of the control result of the levels of priority (S120).

Here, a process relating to the control of the levels of priority of the correction candidates and the presentation of the correction candidates based on the control result of the levels of priority of the process indicated by reference numeral S120 will be described with reference to FIG. 8, particularly focusing on an example of a case in which control is switched in accordance with the magnitude of an influence of noise.

In a case in which the influence of noise, like a case in which the volume of the noise is less than a threshold value (NO in S121), for example, the information processing device 10 (the priority control unit 105) controls, for example, the levels of priority of the correction candidates on the basis of a level of similarity of pronunciation thereof (S123). In addition, in this case, the information processing device 10 (the output control unit 107) may cause the correction candidates to be presented on the basis of the UI on which each of the correction candidates is presented in the presentation mode corresponding to the case in which an influence of noise is small as illustrated in FIG. 2 (S125).

In addition, in a case in which the influence of the noise is considerable, like in a case in which the volume of the noise is higher than or equal to the threshold value (YES in S121), the information processing device 10 (the priority control unit 105) controls the levels of priority of the correction candidates on the basis of, for example, the co-occurrence relationship between the word/phrase to be corrected and other words/phrases (S127). In addition, in this case, the information processing device 10 (the output control unit 107) may cause the correction candidates to be presented on the basis of the UI on which each of the correction candidates is presented in the presentation mode corresponding to the case in which the influence of the noise is considerable as illustrated in FIG. 5 (S129).

Here, the following processes will be described with reference to FIG. 7 again. In a case in which designation of a correction candidate is received via the input/output device 30, the information processing device 10 (the output control unit 107) confirms the designated correction candidate as a correction candidate for the corresponding word/phrase included in the character information obtained by converting the voice. In this case, the information processing device 10 may replace the corresponding word/phrase included in the character information obtained by converting the voice with the designated correction candidate, and then cause the input/output device 30 to present the character information that has undergone the replacement (S107).

On the other hand, in a case in which no designation of a correction candidate is received, like a case in which there is not a correction candidate desired by the user among the presented correction candidates, or the like (NO in S105), the information processing device 10 may present another correction means to the user (S140). As a specific example, the information processing device 10 may present all correction candidates, without limitation to the control result of the levels of priority, via the input/output device 30. In addition, as another example, the information processing device 10 may present a UI for the user to directly correct a correction target via the input/output device 30. In addition, as another example, the information processing device 10 may urge the user to input a voice again.

The example of the flow of the series of processes of the information processing system according to the present embodiment has been described above with reference to FIGS. 7 and 8.

2.4. Modified Examples

Next, modified examples of the information processing system according to the present embodiment will be described.

2.4.1. Modified Example 1-1: One Example of UI for Presenting Correction Candidates First, as Modified example 1-1, an example of a UI for presenting correction candidates in a case in which character information obtained by converting a voice is corrected will be described. As described above, in a case in which a voice is recognized and converted into character information, an error that occurs during sound analysis or an error that occurs during language analysis is assumed, and the number of correction candidates tends to increase further. Thus, there may be a case in which it is difficult for a user to select a desired correction candidate when all correction candidates are presented. Considering this situation, when an information processing system according to Modified example 1-1 presents candidates with similar pronunciation, a user is caused to select correct pronunciation and then correction candidates with the selected pronunciation (i.e., homonyms) are presented.

Figure 9:
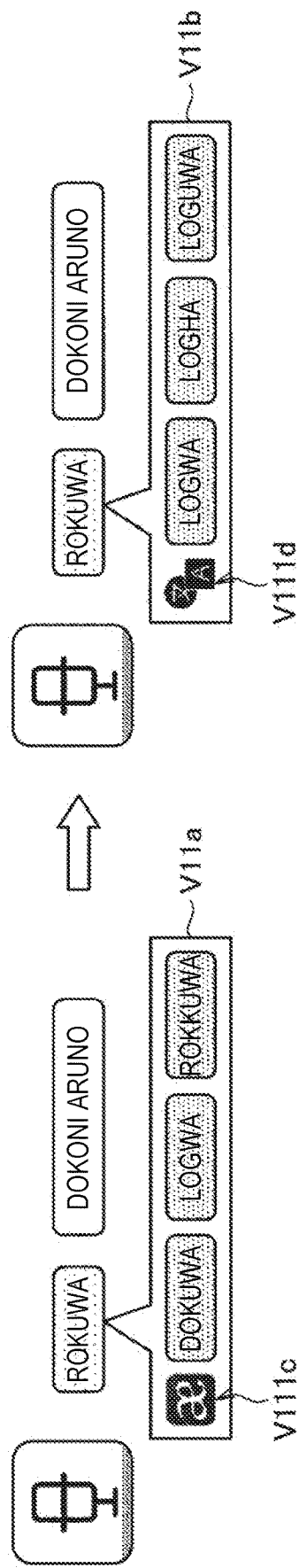
FIG. 9 is an explanatory diagram for describing an example of a UI provided by an information processing system according to Modified example 1-1 of the embodiment.

For example, FIG. 9 is an explanatory diagram for describing an example of a UI provided by the information processing system according to Modified example 1-1. In the example illustrated in FIG. 9, a user utters "Logwa dokoni aruno?" in Japanese, and the information processing system presents the user with Japanese character information of "Rokuwa dokoni aruno" as a recognition result of the voice uttered by the user. In addition, the information processing system is assumed to receive selection of the word/phrase "rokuwa" included in the presented character information, which is an erroneous recognition result of "logwa," as a correction target from the user.

In this case, the information processing system first causes the user to select correct pronunciation by presenting display information V11a in which other words/phrases with similar pronunciation (e.g., "dokuwa," "logwa," "rokkuwa," etc.) to the selected word/phrase "rokuwa" are presented as illustrated on the left side of FIG. 9. Here, the user is assumed to select the candidate indicating the pronunciation "logwa." Note that, at this time, the information processing system may also present display information V111c such as an icon indicating that the candidates presented in the display information V11a are candidates for the pronunciation, or the like together.

Next, the information processing system causes the user to select a correct correction candidate by presenting display information V11b in which correction candidates indicating the pronunciation of "logwa" selected by the user (e.g., "logwa," "logha," "loguwa." etc.) are presented as illustrated on the right side of FIG. 9.

With this control, since the number of candidates presented in each procedure for candidate selection is limited while the number of procedures increases, a load imposed on the user to search correction candidates can be reduced more than in a case in which a desired correction candidate is selected from a huge number of correction candidates. In addition, since correction candidates with correct pronunciation are presented after the correct pronunciation is selected, an error unique in the voice recognition process can be corrected with higher accuracy.

Note that the information processing system may selectively switch between the UI described as Modified example 1-1 (refer to FIG. 9) and each of the UIs described in the above-described embodiment (e.g., refer to FIG. 1, FIG. 5, and FIG. 6) in accordance with states or situations indicated by acquired context information.

The example of the UI for presenting correction candidates in the case in which character information obtained by converting a voice is corrected has been described above as Modified example 1-1.

2.4.2. Modified Example 1-2: Control in Accordance with State of Input Information Based on Sound Collection Result Next, as Modified example 1-2, an example of a UI for correcting corresponding character information obtained by converting a voice in accordance with a state of input information based on the collection result of a voice uttered by a user will be described.

For example, the number of correction candidates tends to increase further as the length of a word/phrase (a character string) uttered by a user becomes shorter. In addition, in a case in which a word/phrase uttered by a user is a word/ phrase having a large number of candidates with similar pronunciation thereto, the number of correction candidates also increases further. For example, FIG. 10 is an explanatory diagram for describing an overview of an information processing system according to Modified example 1-2, illustrating examples of words/phrases that tend to have a larger number of correction candidates.

Figure 10:
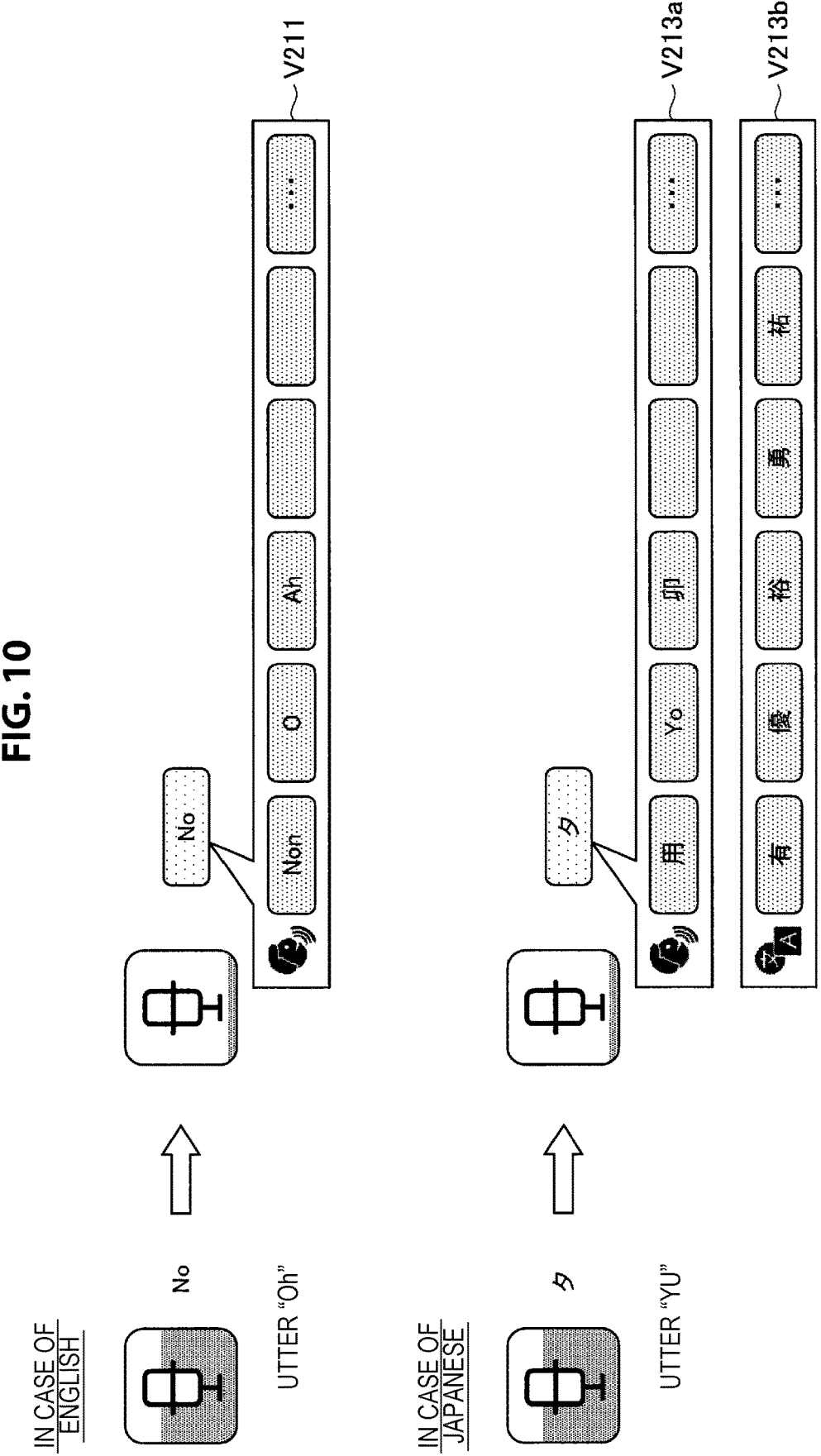
FIG. 10 is an explanatory diagram for describing an overview of an information processing system according to Modified example 1-2 of the embodiment.

For example, the diagram on the upper side of FIG. 10 is an example of a case in which a user utters in English. Specifically, the user utters "oh," and the information processing system presents character information "no" to the user as a recognition result of the voice uttered by the user. In this case, the information processing system presents, for example, display information V211 in which correction candidates with similar pronunciation such as "non," "o," "ah," and the like are presented to the user.

In addition, the diagram on the lower side of FIG. 10 is an example of a case in which the user utters in Japanese. Specifically, the user utters "yu (which means 'help' in Japanese)." and the information processing system presents character information "yu (which means 'evening' in Japanese)" to the user as a recognition result of the voice uttered by the user. In this case, the information processing system presents, for example, display information V213a in which "you." "yo," "u," and the like are presented and display information V213b in which correction candidates indicating similar pronunciation (i.e., homonyms) are presented to the user as correction candidates with similar pronunciation to the word/phrase to be corrected.

As described above, in a situation with a larger number of correction candidates, a load imposed on the user to search for a desired correction candidates tends to increase further in proportional to the number of correction candidates.

Considering the above-described situation, in the information processing system according to Modified example 1-2, information regarding a state of input information based on a collection result of a voice uttered by the user is acquired as context information, and whether or not the number of correction candidates is larger is recognized on the basis of the acquired context information. Then, in a case in which the number of correction candidates is recognized to be larger, the information processing system presents a UI for assisting a search of many number of correction candidates for a desired correction candidate to the user. For example, FIGS. 11 and 12 are explanatory diagrams for describing an example of a UI provided by the information processing system according to Modified example 1-2.

Figure 11:
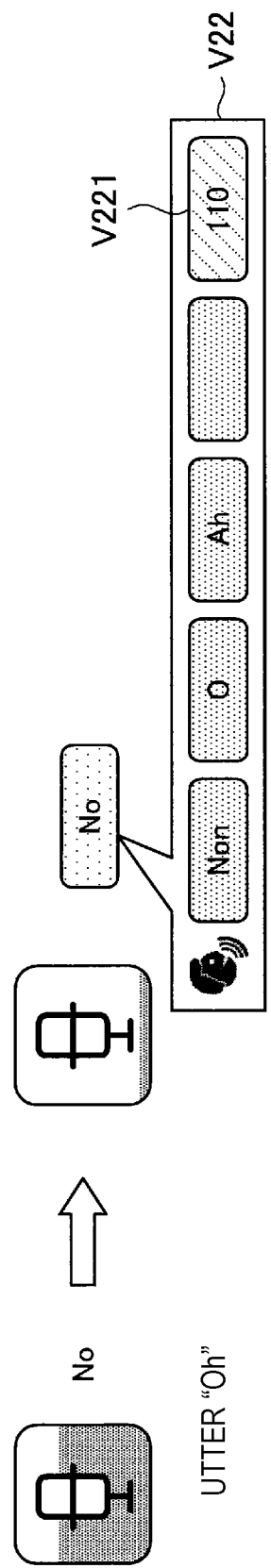
FIG. 11 is an explanatory diagram for describing an example of a UI provided by the information processing system according to Modified example 1-2 of the embodiment.

For example, the information processing system may present display information V22 in which information V221 indicating the number of correction candidates is presented along with correction candidates for a word/phrase to be corrected as illustrated in FIG. 11. With this configuration, eve in a case in which all correction candidates are not presented, the user can recognize the number of correction candidates, and thus can estimate the effort for searching for his or her desired correction candidate.

Figure 12:
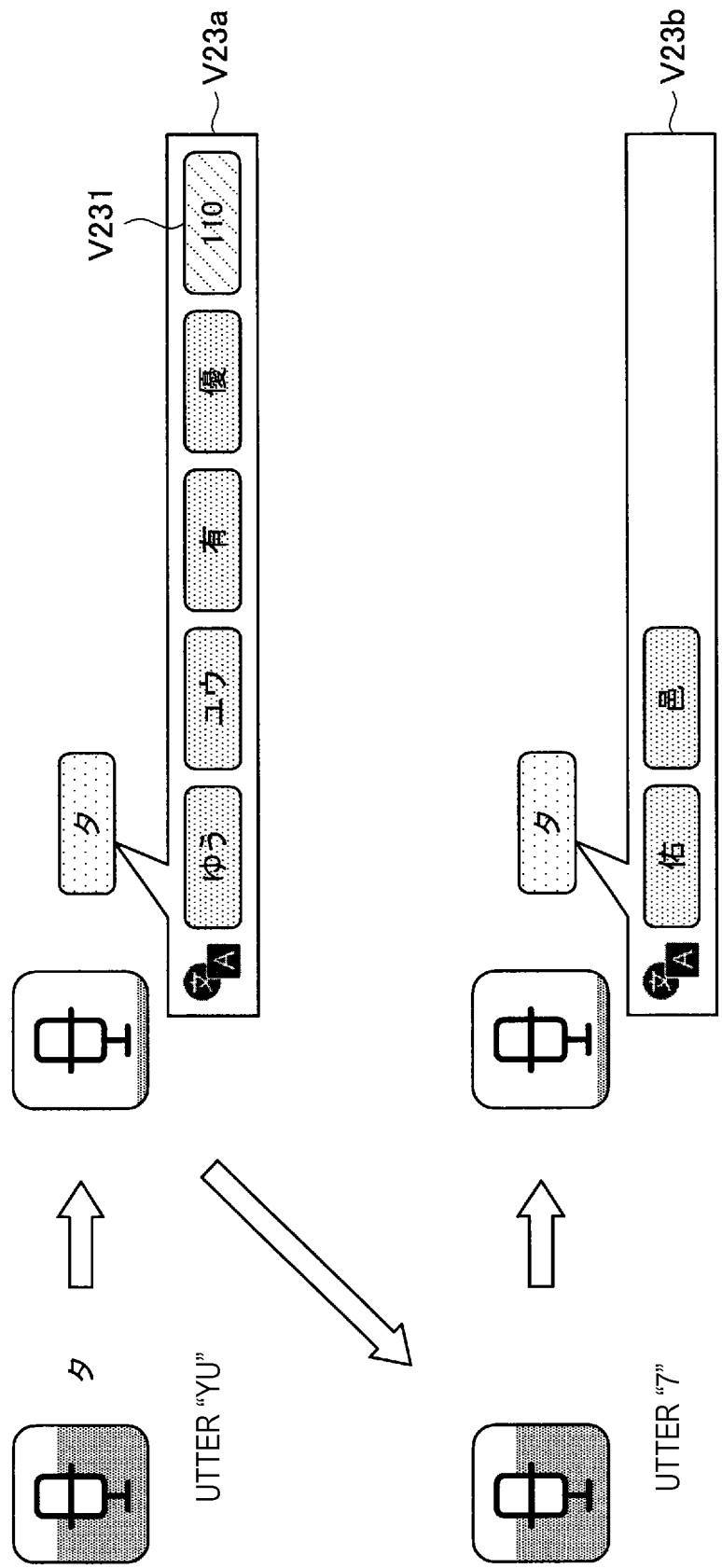
FIG. 12 is an explanatory diagram for describing an example of a UI provided by the information processing system according to Modified example 1-2 of the embodiment.

In addition, in the example illustrated in FIG. 12, in a case in which the number of correction candidates is large as illustrated in the upper-right diagram, for example, the information processing system presents display information V23a in which correction candidates indicating pronunciation, like Hiragana. Katakana, or the like of the Japanese language, are preferentially presented to the user. In addition, at this time, the information processing system may present information V231 indicating the number of correction candidates together, as in the example illustrated in FIG. 11.

In addition, the information processing system may provide a function of narrowing down correction candidates from the presented correction candidates under a designated condition.

In the example illustrated in FIG. 12, for example, the user utters "yu (which means 'help' in Japanese)" as illustrated in the upper-left diagram, and the information processing system recognizes the uttered voice as "yu (which means 'evening' in Japanese)" and presents correction candidates therefor in accordance with the recognition result as illustrated in the upper-right diagram. On the basis of this situation, the information processing system receives an input of information indicating the condition of the number of stokes of correction candidates through a voice of the user, for example, as illustrated in the lower-left diagram. In the example illustrated in FIG. 12, for example, the number of stokes of correction candidates is designated as "7." Receiving the designation of the condition, the information processing system extracts correction candidates satisfying the designated condition among the correction candidates for the word/phrase to be corrected and presents display information V23b in which the extracted correction candidates are presented to the user. In the example illustrated in FIG. 12, for example, the information processing system extracts correction candidates of which the number of strokes is "7" and presents the extracted correction candidates to the user. With this configuration, the user can search many correction candidates for his or her desired correction candidate without a tiresome operation. Note that the same function is not limited to the application to the Japanese language, and can also be applied to other languages (e.g., English). As a specific example, in the case of English, the information processing system may receive designation of, for example, the number of characters and extract correction candidates.

The example of the UI for correcting corresponding character information obtained by converting a voice in accordance with a state of input information based on a collection result of the voice uttered by the user has been described above as Modified example 1-2 with reference to FIGS. 10 to 12.

2.4.3. Modified Example 1-3: Control in Accordance with Mode of Information Input Next, as Modified example 1-3, an example of a UI for correcting character information obtained by converting a voice in accordance with a mode of information input by a user to an information processing system will be described.

Figure 13:
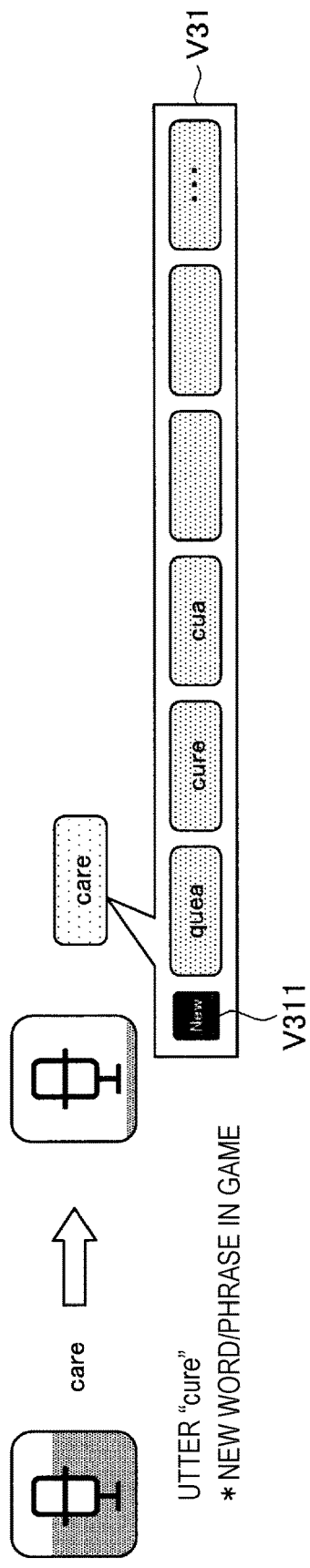
FIG. 13 is an explanatory diagram for describing an example of a UI provided by the information processing system according to Modified example 1-3 of the embodiment.
Figure 14:
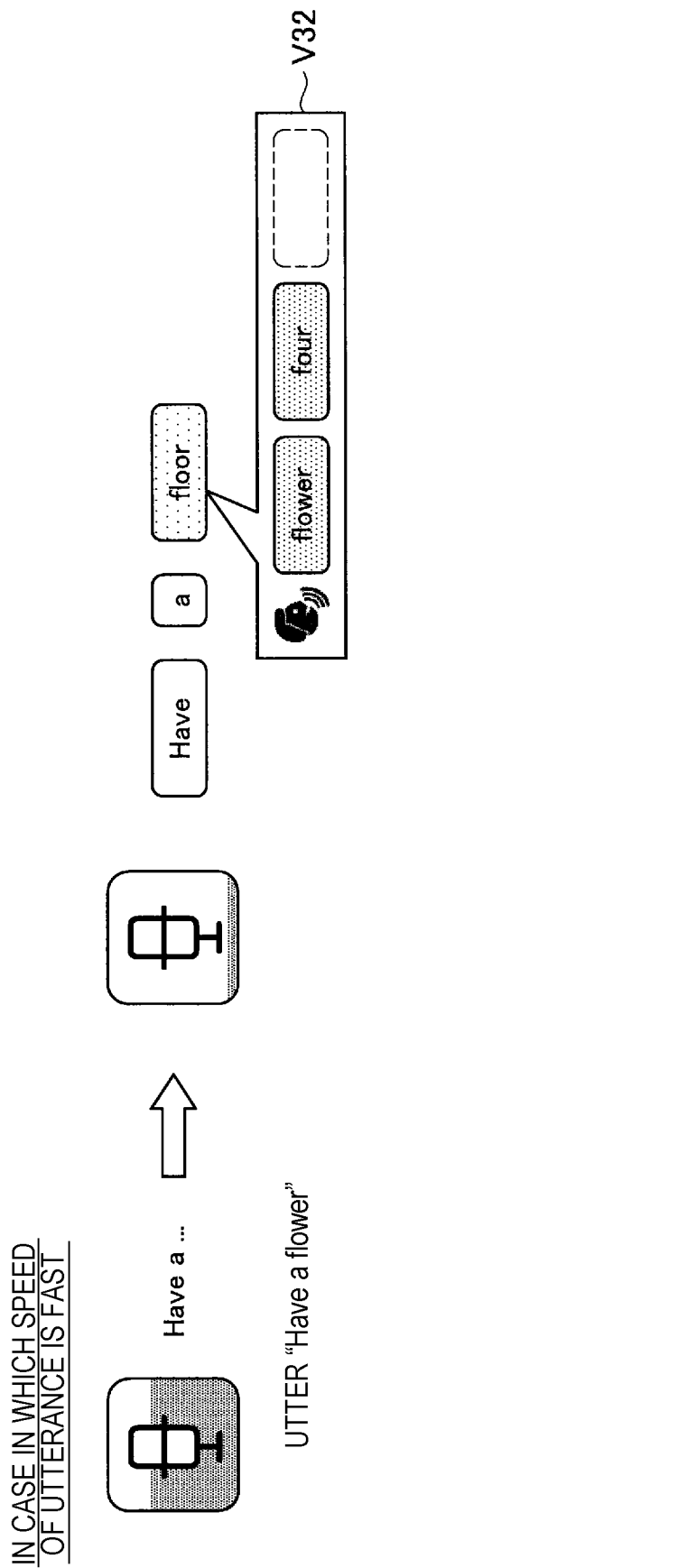
FIG. 14 is an explanatory diagram for describing an example of a UI provided by the information processing system according to Modified example 1-3 of the embodiment.
Figure 16:
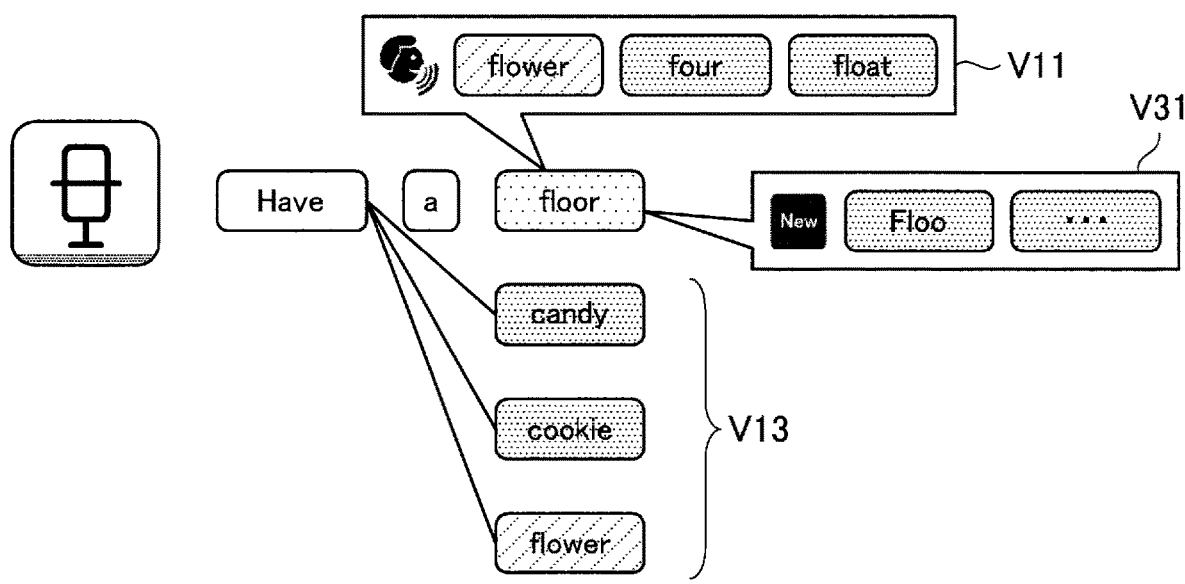
FIG. 16 is an explanatory diagram for describing an example of a UI provided by the information processing system according to Modified example 1-3 of the embodiment.

For example, FIGS. 13 to 16 are explanatory diagram for describing an example of a UI provided by the information processing system according to Modified example 1-3. Note that FIGS. 13 to 15 illustrate an example of control particularly in accordance with a mode of utterance (e.g., a speed of utterance) in a case in which a user inputs a voice as a mode of information input. In addition, FIG. 16 illustrates an example of control in accordance with a mode of an operation in a case in which the operation is performed via another input device when the user inputs his or her voice.

First, the example illustrated in FIG. 13 is focused. FIG. 13 illustrates an example of a UI presented in a case in which, when the user is playing a game and information is input through his or her voice, the voice is uttered slowly (i.e., in a case in which the speed of speech is slow). Specifically, in the situation in which the user is uttering slowly, there is a high likelihood of an uttered word/phrase, for example, being a word/phrase with lower awareness than generally used words/phrases, like proper nouns, terminology of games, and the like. In such a situation, even if correction candidates are inferred with reference to a generic corpus, there is a likelihood of the level of priority of the correction candidates intended by the user getting lower. Thus, in a case in which a situation of the user uttering slowly is recognized on the basis of context information, the information processing system according to Modified example 1-3 may infer the correction candidates with reference to a proper noun corpus or a corpus unique to a function (e.g., of a game etc.) being executed.

In the example illustrated in FIG. 13, for example, the users utters "cure" that is a new word/phrase used in a game, and the information processing system recognizes the uttered voice as "care" and presents display information V31 in which correction candidates are presented in accordance with the recognition result. Note that, at this time, the information processing system controls the levels of priority of the correction candidates on the basis of a corpus unique to the game being executed and presents the correction candidates on the basis of the control result of the levels of priority. In the example illustrated in FIG. 13, for example, the information processing system presents "quea," "cure," "cua," and the like as correction candidates for the word/phrase "care" to be corrected. In addition, in a case in which data referred to for controlling the levels of priority is switched, like the above-described various corpuses and the like, the information processing system may present information V311 indicating that data referred to has been switched (e.g., information in accordance with data referred to) together with the correction candidates.

Note that, although the example in which corpuses are switched has been described mainly focusing on the speed of speech in the above-described example, the embodiment is not necessarily limited only to the above-described example. That is, a corpus to be used and a way of controlling the levels of priority of correction candidates in accordance with a mode of utterance (e.g., the volume, intonation, etc.), without limitation to a speed of utterance, for example, may be set in advance in accordance with a use case, or the like. In addition, the information processing system may be configured such that the setting is appropriately switched by the user through a predetermined operation.

Next, the example illustrated in FIG. 14 will be focused on. FIG. 14 illustrates an example of a UI presented in a case in which a voice of a user is uttered fast (i.e., a case in which a speed of utterance is fast). In the case in which a speed of utterance of a user is fast, a situation in which the user is in a hurry or anxious for any reason. Thus, in a case in which the situation in which a user utters fast is recognized on the basis of context information, the information processing system according to modified example 1-3 may control a presentation mode of correction candidates so that the user can select the correction candidates more easily.

In the example illustrated in FIG. 14, for example, in the case in which the situation of the user uttering fast is recognized, the information processing system improves visibility of correction candidates by limiting the number of correction candidates as indicated by reference numeral V32. Note that the number of presented correction candidates may be set in advance considering, for example, a use case, or the like. In addition, as another example, in a case in which it is not possible to uniquely recognize the voice uttered by the user in the situation of the user uttering fast, the information processing system may urge the user to input his or her voice again, without presenting correction candidates.

Next, the example illustrated in FIG. 15 will be focused on. FIG. 15 is an example of another UI presented in a case in which a user is uttering his or her voice fast (i.e., a case in which a speed of utterance is fast), particularly illustrating a case in which the voice uttered by the user in Japanese is recognized. In the example illustrated in FIG. 15, for example, FIG. 15, the user utters "where is yakushou (which means 'herb' in Japanese) wa doko?," and the information processing system recognizes the uttered voice as "akushouwa doko?." At this time, in the situation of the user uttering fast, the information processing system may preferentially present character information indicating the pronunciation such as Hiragana, rather than character information (a sentence, etc.) considering the semantic content of the Chinese characters of utterance as the recognition result of the voice. With this configuration, even in a situation in which a user is in a hurry for any reason, for example, when character information obtained by converting his or her voice is to be corrected, an error of conversion into Chinese characters hardly occurs, and thus the correction becomes easier.

Next, the example illustrated in FIG. 16 will be focused on. FIG. 16 is an example of a UI presented in a case in which, in a situation of a user performing an operation via another input device when the user inputs his or her voice, the user is operating the input device in a relaxed manner (e.g., operating the input device slowly). Specifically, in the situation of the user performing the operating in a relaxed manner, there is a likelihood of many times being spared for checking character information obtained by converting a voice. Thus, in such a situation, the information processing system may present a plurality of types of correction candidates as correction candidates of the character information obtained by converting the voice.

In the example illustrated in FIG. 16, for example, the information processing system presents display information V11, V13, and V31 in which correction candidates are presented on the basis of different algorithms as correction candidates for a word/phrase to be corrected. For example, the display information V11 is display information for presenting correction candidates of which the levels of priority are controlled in accordance with the levels of similarity of the pronunciation, as described with reference to FIG. 2. In addition, the display information V13 is display information for presenting correction candidates of which the levels of priority are controlled in accordance with the co-occurrence relationship between the word/phrase to be corrected and other words/phrases, as described with reference to FIG. 5. In addition, the display information V31 is display information for presenting correction candidates inferred by referring to a corpus unique to a function being executed (e.g., a game, etc.), as described with reference to FIG. 13.

The example of the UI for correcting the character information obtained by converting the voice in accordance with a mode of information input by the user with respect to the information processing system has been described above as Modified example 1-3.

2.5. Practical Examples

Next, other practical examples of the information processing systems according to the above-described embodiment and modified examples will be described giving specific examples thereof.

In a case in which a use case in which a user is playing a game is assumed, for example, information indicating a speed or strength (pressure) of input to a controller, a touch panel, or the like can be used as context information.

Specifically, in a case in which input to an input device is fast or pressure at the time of input is strong, a situation in which a user is in a hurry or anxious for any reason can be assumed. Thus, in this case, the information processing system may control, for example, the levels of priority of correction candidates to be presented or a presentation mode of the correction candidates in accordance with the recognition result of the situation in which the user is in a hurry or anxious. In addition, in a case in which a user is operating an input device in a relaxed manner (e.g., operating the input device slowly) as described above, the user can be recognized as being in a situation of sparing relatively many times for performing various kinds of work.

In addition, an image of a user captured by an imaging unit of a camera or the like can be used as context information for recognizing a state or a situation of the user. As a specific example, a facial expression of the user can be inferred and the state of the user can be recognized on the basis of the inference result by analyzing the face image of the user captured by the imaging unit. More specifically, anxiety of the user or the like can be inferred from a worrisome look of the face of the user.

In addition, by detecting a line of sight of a user from an analysis result of an image of the user captured by the imaging unit, a detection result of an infrared sensor provided on a head-mounted display (HMD), or the like, the detection result of the line of sight can as well be used as context information. As a specific example, in a situation in which a user is playing a game, in a case in which a line of sight of the user moves to an area in which the play screen is presented, rather than a text information input area, a situation in which the user is in a hurry or anxious for any reason can be assumed. The same situation can also be assumed in a case in which the line of sight of the user is moving outside the text information input area.

In addition, a detection result of biological information such as an amount of perspiration can as well be used as context information as described above. As a specific example, in a case in which an amount of perspiration is larger than usual, a situation in which the user is in a hurry or anxious for any reason can be assumed.

Other practical examples of the information processing systems according to the above-described embodiment and modified examples have been described giving specific examples. Note that the above-described examples are merely examples and do not necessarily limit the usage form of the information processing system according to the present embodiment.

2.6. Evaluation

The information processing system according to the present embodiment presents candidates for character information obtained by converting a collected voice in a mode in accordance with context information acquired in a period for collection of a voice as described above. Specifically, the information processing system controls the levels of priority of other candidates (i.e., correction candidates) for at least parts of words/phrases included in the character information obtained by converting the voice in accordance with various states or situations indicated by the context information. In addition, the information processing system presents correction candidates for at least parts of words/phrases included in the character information obtained by converting the voice in a presentation mode in accordance with the various states or situations indicated by the context information.

With this control, even if an error occurs in a voice recognition result, the information processing system according to the present embodiment can dynamically control the level of priority of each correction candidate in accordance with a state or situation of each occasion and present more preferable correction candidates to the user on the basis of the control result of the level of priority. With this configuration, there is a higher likelihood of the user being able to specify a candidate indicating originally intended content from limited correction candidates, and thus the user can correct the voice recognition result with a simple operation, without tiresome operations of checking many candidates.

In addition, according to the information processing system according to the present embodiment, correction candidates for a word/phrase to be corrected are presented in a more preferable presentation mode (e.g., a presentation mode in accordance with an algorithm for control of the levels of priority) in accordance with the state or situation of each occasion. Thus, the user can intuitively recognize the correction candidates for the word/phrase to be corrected in accordance with the various state or situation, without tiresome checking work, and further can select a desired correction candidate with a simple operation.

3. Second Embodiment

3.1. Overview

Next, an information processing system according to a second embodiment of the present disclosure will be described. Generally, there is a tendency that it takes more time in a case in which information is input through a voice to confirm the recognition result of the voice after the voice input is started than in a case in which information is input via an input device such as a keyboard.

Figure 17:
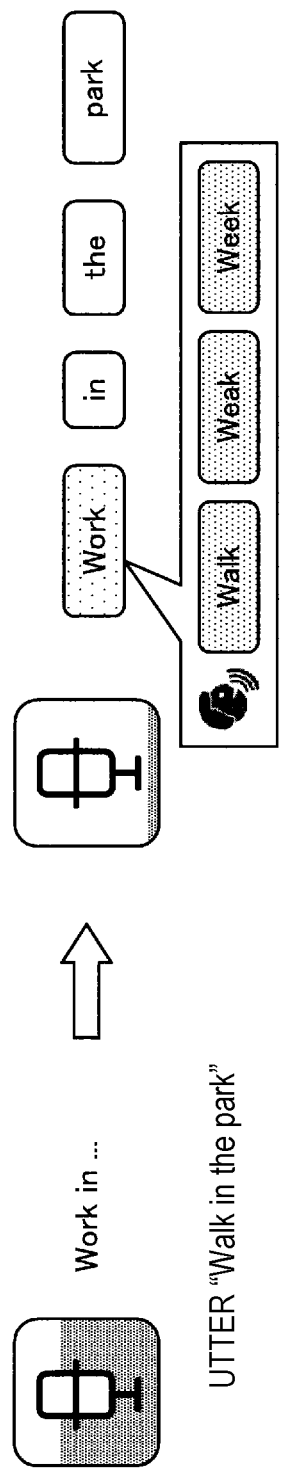
FIG. 17 is an explanatory diagram for describing an overview of an information processing system according to a second embodiment of the present disclosure.

Here, a specific example will be described with reference to FIG. 17. FIG. 17 is an explanatory diagram for describing an overview of the information processing system according to the present embodiment, illustrating an example of a UI presented to a user by recognizing an uttered voice and converting the voice into character information. In the example of FIG. 17, for example, the user utters "walk in the park," and the information processing system presents character information "work in the park" to the user as the recognition result of the voice uttered by the user. That is, in the example illustrated in FIG. 17, the information processing system erroneously recognized the word/phrase "walk" uttered by the user as "work." In addition, in the example illustrated in FIG. 17, the information processing system receives designation of the word/phrase "work" that has been erroneously recognized from the user and presents correction candidates for the word/phrase.

Meanwhile, after the series of voice of "walk in the park" uttered by the user is recognized, the recognition result of the voice is presented in the example illustrated in FIG. 17. In such a case, for example, even if the input voice is erroneously recognized, it is difficult for the user to recognize whether an error has occurred in the recognition or whether or not correction candidates are correctly specified in a case in which the error is to be corrected until the recognition process (e.g., a voice recognition process (sound analysis), natural language processing (language analysis), etc.) on the series of voice is completed. For this reason, for example, even if the user recognizes that there is not his or her desired correction candidate among presented correction candidates and makes a decision on whether or not it is desirable to input his or her voice again, the user can make the decision after a series of recognition processes are completed.

Figure 18:
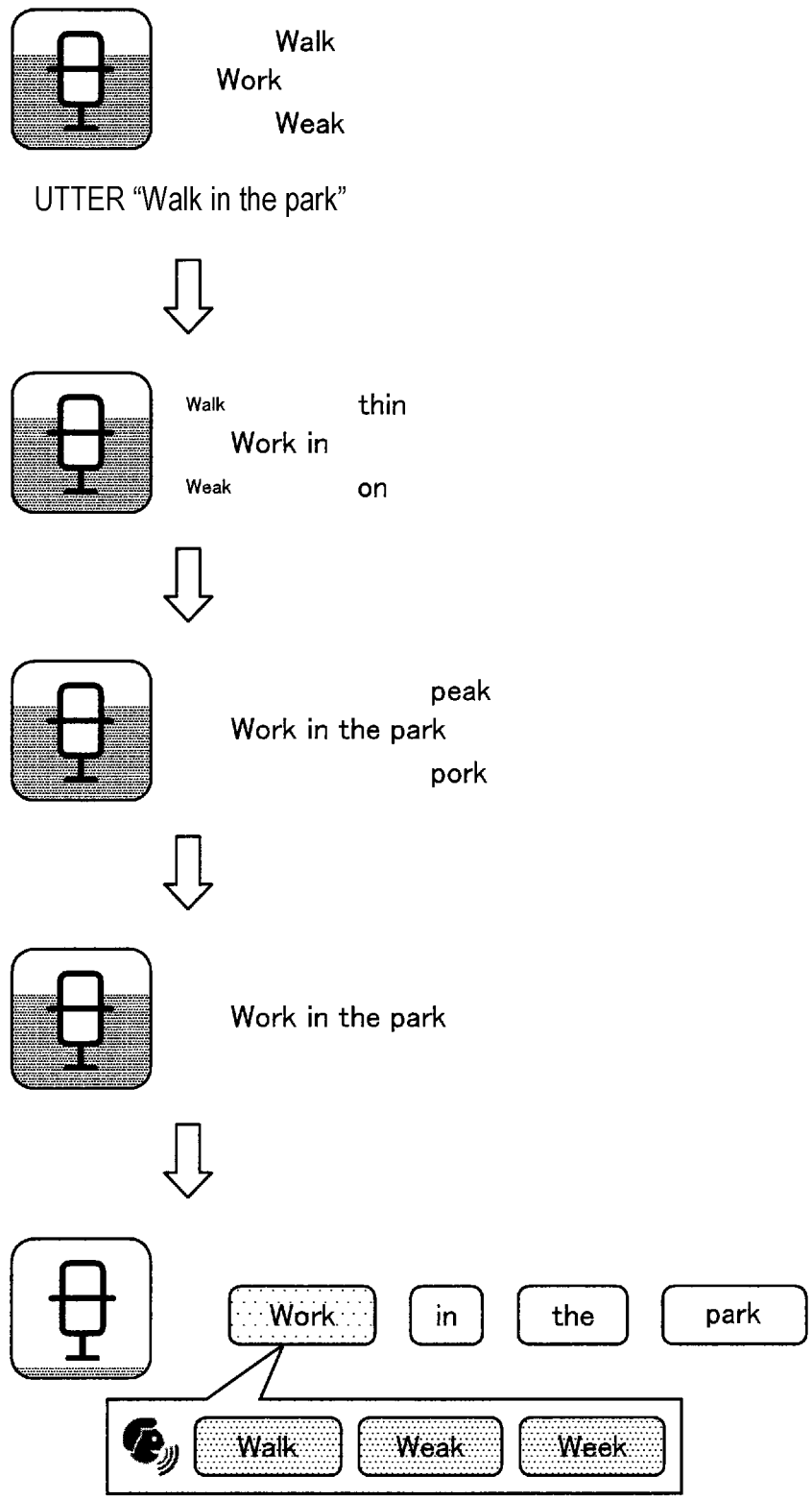
FIG. 18 is an explanatory diagram for describing an overview of a UI provided by the information processing system according to the embodiment.

Considering the situation, the information processing system according to the present embodiment provides a mechanism in which, even in a case in which an error occurs during recognition of a voice, a user can make a decision on whether or not it is desirable to input his or her voice again at an earlier timing. For example, FIG. 18 is an explanatory diagram for describing an overview of a UI provided by the information processing system according to the present embodiment. In the example of FIG. 18, it is assumed that a user utters "walk in the park," and the information processing system recognizes the voice as "work in the park."

The information processing system according to the present embodiment successively executes various recognition processes such as the voice recognition process, natural language processing, and the like on a successively collected voice, and successively presents character information of the word/phrase corresponding to a recognition-processed voice among the collected series of voice along with other candidates (i.e., correction candidates) for the word/phrase.

The diagram of the first stage of FIG. 18 illustrates, for example, an example of display information presented at a timing at which the word/phrase "walk" included in the collected voice of "walk in the park" is recognized. At this time, the information processing system presents the word/phrase "work" as a recognition result of the voice of "walk," and presents "walk" and "weak" as other candidates for the word/phrase. Accordingly, the user can recognize that the voice of "walk" has been erroneously recognized as "work" and "walk" that is the actually uttered word/phrase is specified as another candidate. Thus, the user, for example, can continue uttering without change and make a decision that the word/phrase "work" based on the erroneous recognition result may be later replaced with "walk" presented as a candidate at this timing.

Likewise, the diagram of the second stage of FIG. 18 illustrates an example of display information presented at the timing at which the word/phrase "in" included in the collected voice of "walk in the park" is recognized. In addition, the diagram of the third stage of FIG. 18 illustrates an example of display information presented at the timing at which the word/phrase "park" included in the collected voice of "walk in the park" is recognized. In this way, when a series of collected voice is converted into character information on the basis of the voice recognition process, the information processing system according to the present embodiment successively presents the course of the process of converting the voice into the character information.

In addition, when recognition of the series of collected voice is completed as in the diagram of the fourth stage of FIG. 18, the UI for correcting the character information obtained by converting the voice is presented as illustrated in the diagram of the fifth stage.

With the above-described control, by selecting the actually uttered word/phrase "walk" from the presented correction candidates for example, the user can correct the erroneously recognized word/phrase "work."

In addition, a case in which, for example, some words/phrases of a series of uttered voice are erroneously recognized and actually uttered words/phrases are not specified as other candidates for the words/phrases can be assumed. In such a situation, before the recognition result of the series of voice is presented, the user can make a decision of stopping uttering and performing voice input again, for example, at the timing at which the recognition result of the target words/phrases is presented according to the information processing system according to the present embodiment.

The overview of the information processing system according to the second embodiment of the present disclosure has been described above. Note that the information processing system according to the present embodiment will be described below in more detail.

3.2. Configuration

Figure 19:
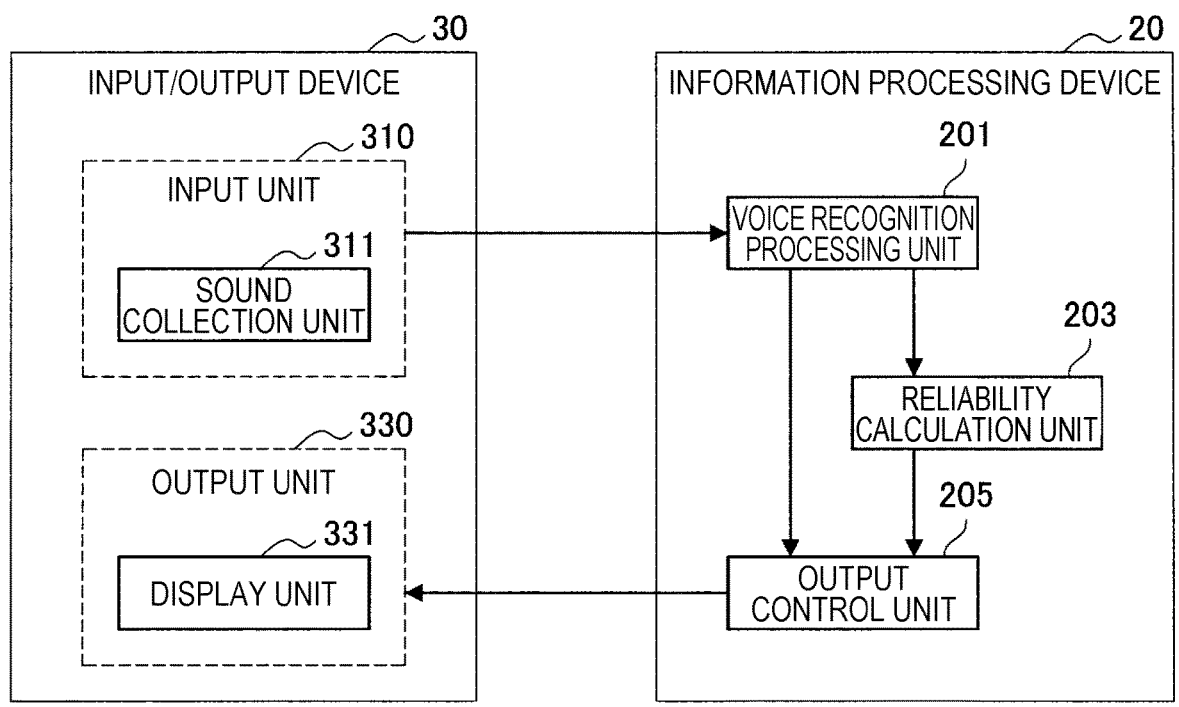
FIG. 19 is a block diagram illustrating an example of a functional configuration of the information processing system according to the embodiment.

Next, an example of a functional configuration of the information processing system according to the present embodiment will be described with reference to FIG. 19. FIG. 19 is a block diagram illustrating the example of the functional configuration of the information processing system according to the present embodiment.

The information processing system 2 according to the present embodiment includes an input/output device 30 and an information processing device 20 as illustrated in FIG. 19. Note that the input/output device 30 corresponds to the input/output device 30 of the information processing system 1 according to the above-described first embodiment. That is, configurations in FIG. 19 with similar reference numerals to those in FIG. 4 are assumed to indicate similar configurations to those in the example illustrated in FIG. 4. Thus, in the present description, the configuration of an information processing device 20 will be focused on, and detailed description of similar configurations to those of the information processing system 1 according to the above-described first embodiment will be omitted.

In addition, in the example illustrated in FIG. 19, in order to make the configuration of the information processing device 20 and the input/output device 30 understood easier, a communication unit for the information processing device 20 and the input/output device 30 to transmit and receive information via a network is not illustrated. Note that a configuration of the communication unit is similar to that of the information processing system 1 (see FIG. 4) according to the above-described first embodiment. In addition, it is assumed in the following description that transmission and reception of information are performed via the communication unit in a case in which each internal configuration of each of the information processing device 20 and the input/output device 30 performs transmission and reception of information with an external device via a network even when there is no particular explanation.

The information processing device 20 includes a voice recognition processing unit 201, a reliability calculation unit 203, and an output control unit 205 as illustrated in FIG. 19.

The voice recognition processing unit 201 has a configuration for converting a voice included in sound collected by an input unit 310 (a sound collection unit 311) of the input/output device 30 into character information. Note that, since a mechanism for converting a voice into character information is similar to that of the voice recognition processing unit 101 of the information processing device 10 according to the above-described first embodiment, detailed description thereof will be omitted.

The voice recognition processing unit 201 successively acquires sound signals based on the collection result of the voice from the input unit 310, and successively executes extraction of voice signals from the acquired sound signals, a voice recognition process (sound analysis) on the extracted voice signals, and natural language processing (language analysis) on the result of the voice recognition process. With the above-described configuration, the voice recognition processing unit 201 successively converts a successively input voice into character information.

In addition, at this time, the voice recognition processing unit 201 may specify other candidates for a word/phrase converted into the character information on the basis of the voice recognition process and natural language processing. For example, the voice recognition processing unit 201 may specify other candidates with similar pronunciation to the word/phrase obtained by converting the voice into the character information on the basis of sound analysis such as the voice recognition process. In addition, as another example, the voice recognition processing unit 201 may specify other candidates for at least parts of words/phrases included in the character information obtained by converting the voice on the basis of the co-occurrence relationship between the other candidates for the words/phrases and other words/phrases on the basis of the result of language analysis such as the natural language processing.

Then, the voice recognition processing unit 201 successively outputs the character information obtained by converting the voice and information indicating the other candidates for the words/phrases included in the character information to the output control unit 205 on the basis of the result of the voice recognition process and the natural language processing with respect to the acquired sound signals. In addition, the voice recognition processing unit 201 successively outputs information indicating the result of the sound analysis (e.g., the voice recognition process) on the acquired sound signals and the result of the language analysis (e.g., the natural language processing) on the result of the sound analysis to the reliability calculation unit 203.

The reliability calculation unit 203 successively acquires the information indicating the result of the sound analysis (e.g., the voice recognition process) on the acquired sound signals and the result of the language analysis (e.g., the natural language processing) on the result of the sound analysis from the voice recognition processing unit 201. Then, the reliability calculation unit 203 calculates reliabilities of the words/phrases included in the character information obtained by converting the voice and the other candidates for the words/phrases on the basis of the acquired information.

As a specific example, the reliability calculation unit 203 may calculate the reliabilities of the words/phrases included in the character information obtained by converting the voice and the other candidates for the words/phrases in accordance with the levels of similarity on the basis of the result of the sound analysis. In addition, as another example, the reliability calculation unit 203 may calculate the reliabilities of the target words/phrases and the other candidates for the words/phrases on the basis of the co-occurrence relationship between the target words/phrases included in the character information obtained by converting the voice and already recognized other words/phrases on the basis of the result of the language analysis. Of course, the reliability calculation method described above is merely an example, and a calculation method is not necessarily limited to the above-described example. As a specific example, the reliability calculation unit 203 may calculate the reliabilities by comprehensively determining conditions including a sound model, a language model, a state or a situation at the time of sound collection, content being executed, and the like.

Then, the reliability calculation unit 203 outputs information indicating the calculation results of the reliabilities of the words/phrases included in the character information obtained by converting the voice and the other candidates for the words/phrases to the output control unit 205.

The output control unit 205 successively acquires information indicating the character information obtained by converting the voice and the other candidates for the words/phrases included in the character information from the voice recognition processing unit 201. In addition, the output control unit 205 acquires the information indicating the calculation results of the reliabilities of the words/phrases included in the character information and the other candidates for the words/phrases from the reliability calculation unit 203.

Upon acquiring the character information obtained by converting the voice, the output control unit 205 causes the input/output device 30 to successively present the character information. In addition, at this time, the output control unit 205 causes the input/output device 30 to present at least some candidates of the other candidates for the words/phrases included in the character information in association with the words/phrases on the basis of the calculation results of the reliabilities of each of the words/phrases and the other candidates. On the basis of the above-described control, the output control unit 205 causes the input/output device 30 to successively update the UI (e.g., see FIG. 18) for presenting the character information obtained by converting the voice and correction candidates for the words/phrases included in the character information.

Note that, when the input/output device 30 is caused to present correction candidates, the output control unit 205 may control a presentation mode of the correction candidates in accordance with the reliability of each correction candidate. As a specific example, when correction candidates are to be displayed, the output control unit 205 may control colors, sizes, shades, and the like of the correction candidates in accordance with reliabilities of the correction candidates. Whit this control, the user can intuitively recognize the reliability of each correction candidate in accordance with the presentation mode of the correction candidate.

Note that the functional configuration of the information processing system illustrated in FIG. 19 is merely an example, and a functional configuration of the information processing system is not necessarily limited only to the example illustrated in FIG. 19 as long as the functions of each of the above-described configurations can be realized. For example, part of the configurations of the information processing device 20 may be provided outside the information processing device 20. As a specific example, a configuration corresponding to the output control unit 205 may be provided on the input/output device 30 side. In this case, the input/output device 30 may acquire character information obtained by converting a voice, information indicating other candidates for a word/phrase included in the character information, and information indicting the calculation result of reliabilities of the word/phrase included in the character information and the other candidates for the word/phrase from the information processing device 20.

In addition, as another example, each configuration of the information processing device 20 may be configured as a part of the information processing device 10 according to the above-described first embodiment (see FIG. 4). Note that, in this case, at least part of the functions of the respective configurations of the information processing device 20 may be realized by any configuration included in the information processing device 10. As a specific example, the function of the above-described voice recognition processing unit 201 may be realized by the voice recognition processing unit 101 included in the information processing device 10.

In addition, at least part of the configurations included in the input unit 310 and the output unit 330 may be provided outside the input/output device 30. In addition, the input/output device 30 and the information processing device 10 may be configured in an integrated manner.

The example of the functional configuration of the information processing system according to the present embodiment has been described above with reference to FIG. 19.

3.3. Process

Figure 20:
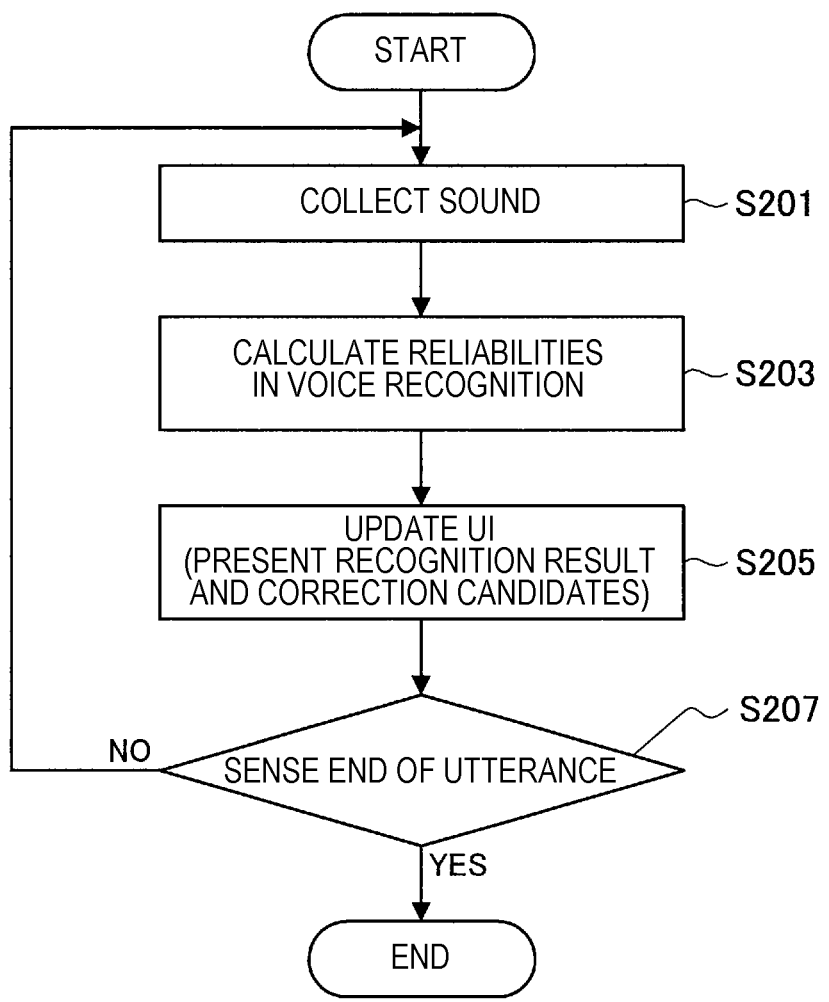
FIG. 20 is a flowchart illustrating an example of a flow of a series of processes of the information processing system according to the embodiment.

Next, an example of a flow of a series of processes by the information processing system according to the present embodiment will be described with reference to FIG. 20. FIG. 20 is a flowchart illustrating the example of the flow of the series of processes by the information processing system according to the present embodiment.

As illustrated in FIG. 20, the input/output device 30 (the sound collection unit 311) collects sound such as a voice of a user, or the like and successively transmits sound signals based on the sound collection result to the information processing device 20 via a network as illustrated in (S201).

The information processing device 20 (the voice recognition processing unit 201) successively acquires the sound signals based on the sound collection result from the input/output device 30 and converts a voice included in the sound into character information by performing sound analysis and language analysis on the acquired sound signals. In addition, at this time, the information processing device 20 (the voice recognition processing unit 201) may specify other candidates for the wordphrase converted into the character information on the basis of the voice recognition process and the natural language processing. In addition, the information processing device 20 (the reliability calculation unit 203) calculates reliabilities of the word/phrase included in the character information obtained by converting the voice and other candidates for the wordphrase on the basis of the results of the sound analysis and the language analysis (S203).

Upon converting the voice into the character information, the information processing device 20 (the output control unit 205) causes the input/output device 30 to present the character information. In addition, at this time, the information processing device 20 causes the input/output device 30 to present at least some candidates of the other candidates of the wordphrase included in the character information in association with the word/phrase on the basis of the calculation result of the reliabilities of each of the word/phrase and the other candidates. In this way, the information processing device 20 causes the input/output device 30 to update the UI for presenting the character information obtained by converting the voice and correction candidates for the word/phrase included in the character information (S207).

The series of processes indicated by reference numerals S201 to S205 are successively executed unless the end of utterance is sensed (NO in S207). In addition, when the end of uttering is sensed (YES in S207), the information processing system ends the series of processes. Note that the information processing device 20 may thereafter cause the input/output device 30 to present, for example, a UI for correcting the character information obtained by converting the series of a collected voice.

The example of the flow of the series of processes of the information processing system according to the present embodiment has been described above with reference to FIG. 20.

3.4. Modified Examples

Next modified examples of the information processing system according to the present embodiment will be described.

3.4.1. Modified Example 2-1: One Example of Interface for Confirming Recognition Result First, an example of an interface for confirming words/phrases successively presented on the basis of a recognition result of a voice will be described as Modified example 2-1. As described above, a collected voice is converted into character information, for example, on the basis of sound analysis (e.g., a voice recognition process) and language analysis (e.g., natural language processing) with respect to the voice. Thus, for example, a case in which the recognition result of the voice based on the result of the sound analysis is corrected on the basis of the result of the language analysis executed later can also be assumed. Meanwhile, correction based on the result of language analysis executed later does not necessarily guarantee presentation of a correction recognition result.

For example, FIG. 21 is an explanatory diagram for describing an example of control by the information processing system according to the present embodiment. In the example illustrated in FIG. 21, a user has uttered "walk in the park." In addition, the information processing system recognizes the uttered voice of "walk" as "walk" first on the basis of the result of sound analysis and corrects the recognized word/phrase "walk" to "work" on the basis of a co-occurrence probability between the word/phrase "in" recognized thereafter. Meanwhile, since the user has uttered "walk" in the example illustrated in FIG. 21, the process of correcting the recognized word/phrase "walk" to "work" is not necessarily a desired process for the user.

Thus, the information processing system according to Modified example 2-1 provides an interface for confirming words/phrases successively presented on the basis of the recognition result of the voice to the user. For example, FIG. 22 is an explanatory diagram for describing an example of a UI provided by the information processing system according to Modified example 2-1.

The user has uttered "walk in the park" in the example illustrated in FIG. 21. Meanwhile, as illustrated in the left diagram of FIG. 22, for example, the information processing system recognizes the uttered voice of "walk" as "walk" on the basis of the result of sound analysis and presents the word/phrase "walk" as the recognition result of the voice. At this time, upon receiving an instruction to confirm the recognition result from the user via a predetermined input device (e.g., a controller, etc.), the information processing system according to Modified example 2-1 confirms the presented word/phrase "walk" as the recognition result of the corresponding voice. Accordingly, as illustrated in the right drawing of FIG. 22, even if the word/phrase "in" is recognized thereafter, the occurrence of a situation in which the recognition result of the word/phrase "walk" is corrected to the word/phrase "work" due to a co-occurrence probability between the word/phrase can be prevented.

Note that the information processing system may identifiably present whether or not it is a state in which an instruction to confirm the recognition result has been received or a word/phrase for which confirmation has been instructed to the user. As a specific example, the information processing system may emphasize and display the word/phrase for which confirmation has been instructed by controlling presentation in a different mode (e.g., in a different color) from other words/phrases.

With the above-described mechanism, in a case in which words/phrases successively presented on the basis of a recognition result of a voice are intended ones (i.e., actually uttered words/phrases), for example, the user can present a situation in which the words/phrases are corrected on the basis of a process executed thereafter by giving a predetermined instruction to the information processing system.

The example of the interface for confirming words/phrases successively presented on the basis of recognition result of the voice has been described above as Modified example 2-1 with reference to FIGS. 21 and 22.

3.4.2. Modified Example 2-2: Control of Correction Candidates in Accordance with State or Situation Next, an example of a case in which correction candidates are controlled in accordance with various states or situations by combining the information processing system according to the present embodiment and the information processing system according to the above-described first embodiment will be described as Modified example 2-2. For example, FIG. 23 is an explanatory diagram for describing an example of a UI provided by an information processing system according to Modified example 2-2.

First, the diagram on the upper side of FIG. 23 will be focused on. The diagram on the upper side of FIG. 23 illustrates an example of a UI presented in a case in which an influence of noise is small (i.e., a case of a quiet environment), in which, while a user utters "have a flower in my garden," the information processing system presents the word/phrase "floor" to the user as the recognition result of the voice "flower." In addition, in a case in which the information processing system according to Modified example 2-2 has recognized to be in an environment with a small influence of noise on the basis of context information, the information processing system may control the levels of priority of correction candidates on the basis of the levels of similarity of pronunciation and present the correction candidates of the target word/phrase on the basis of the control result of the levels of priority. In the diagram on the upper side of FIG. 23, for example, the information processing system presents words/phrases "flower" and "four" having similar pronunciation to "floor" as other candidates (i.e., correction candidates) for the wordphrase "floor."

Next, the diagram on the lower side of FIG. 23 will be focused on. The diagram on the lower side of FIG. 23 illustrates an example of UI presented in a case in which an influence of noise is considerable (i.e., a case of a noisy environment), in which, while the user utters "have a flower in my garden," the information processing system presents the word/phrase "car" to the user as the recognition result of the voice "flower." In addition, the information processing system according to Modified example 2-2 has recognized to be in an environment in which an influence of noise is considerable on the basis of context information, the information processing system may control the levels of priority on the basis of the co-occurrence relationship between the target word/phrase and other words/phrases and present correction candidates for the target word/phrase on the basis of the control result of the levels of priority. In the diagram on the lower side of FIG. 23, for example, the information processing system presents the words/phrases "flower" and "cookie" on the basis of the co-occurrence relationship with the word/phrase "have" as other candidates for the word/phrase "car" (i.e., correction candidates).

With the above-described control, the information processing system according to Modified example 2-2 can dynamically present more preferable correction candidates to the user in accordance with a state or a situation of each occasion.

The example of the case in which correction candidates to be presented are controlled in accordance with various situations or states by combining the information processing system according to the present embodiment with the information processing system according to the above-described first embodiment has been described above as Modified example 2-2 with reference to FIG. 23.

3.5. Evaluation

The information processing system according to the present embodiment successively executes the voice recognition process on a successively collected voice and successively presents character information of a word/phrase corresponding to a voice that has undergone the voice recognition process of the series of collected voice together with other candidates (i.e., correction candidates) for the word/phrase as described above. With this configuration, even when some words/phrases of the series of uttered voice are erroneously recognized, for example, a user can recognize the error before the recognition result of the series of voice is presented. In addition, even in a situation in which an actually uttered word/phrase is not specified as other candidates for the erroneously recognized word/phrase by the information processing system, the user can recognize the situation at a timing at which correction candidates for the target word/phrase are presented. That is, according to the information processing system according to the present embodiment, the user can make a decision to stop uttering and perform voice input again at a timing at which the recognition result of the target word/phrase is presented, for example, before the recognition result of a series of voice is presented.

4. Hardware Configuration

Figure 24:
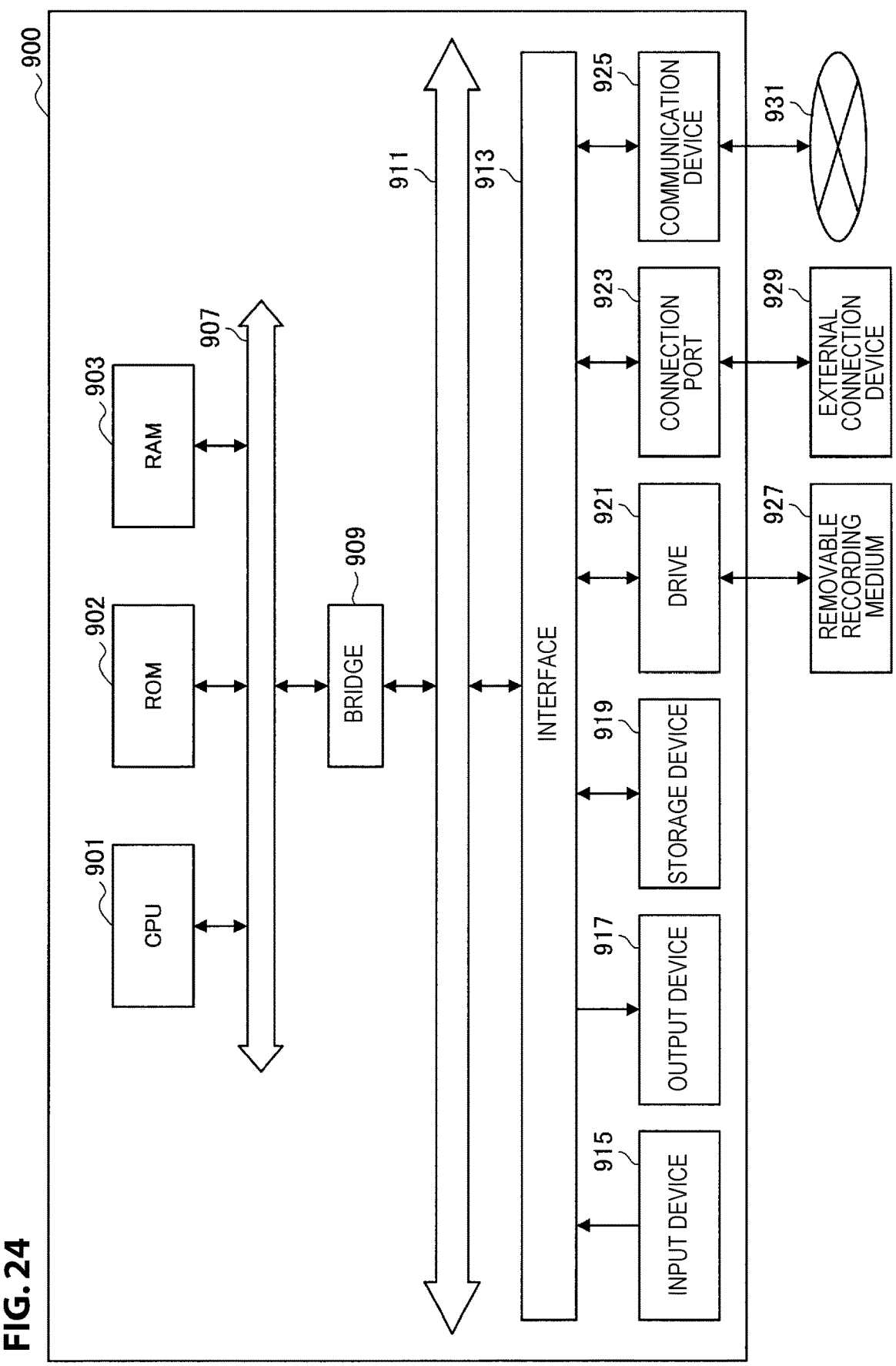
FIG. 24 is a function block diagram illustrating an example of a hardware configuration of an information processing device included in the information processing system according to an embodiment of the present disclosure.

Next, like the information processing devices 10 and 20 and the input/output device 30 described above, a hardware configuration of an information processing device 900 included in the information processing system 1 according to the present embodiment will be described in detail with reference to FIG. 24. FIG. 24 is a function block diagram illustrating an example of the hardware configuration of the information processing device 900 included in the information processing system 1 according to the present embodiment of the present disclosure.

The information processing device 900 included in the information processing system 1 according to the present embodiment mainly includes a CPU 901, a ROM 903, and a RAM 905. Furthermore, the information processing device 900 also includes a host bus 907, a bridge 909, an external bus 911, an interface 913, an input device 915, an output device 917, a storage device 919, a drive 921, a connection port 923, and a communication device 925.

The CPU 901 serves as an arithmetic processing device and a control device, and controls the overall operation or a part of the operation of the information processing device 900 according to various programs recorded in the ROM 903, the RAM 905, the storage device 919, or a removable recording medium 927. The ROM 903 stores programs, operation parameters, and the like used by the CPU 901. The RAM 905 primarily stores programs that the CPU 901 uses and parameters and the like varying as appropriate during the execution of the programs. These are connected with each other via the host bus 907 including an internal bus such as a CPU bus or the like. Note that the voice recognition processing unit 101, the context analysis unit 103, the priority control unit 105, and the output control unit 107 described above with reference to FIG. 4 can be realized by, for example, the CPU 901.

The host bus 907 is connected to the external bus 911 such as a PCI (Peripheral Component Interconnect/Interface) bus via the bridge 909. Additionally, the input device 915, the output device 917, the storage device 919, the drive 921, the connection port 923, and the communication device 925 are connected to the external bus 911 via the interface 913.

The input device 915 is an operation mechanism operated by a user, such as a mouse, a keyboard, a touch panel, buttons, a switch, a lever, or a pedal. Also, the input device 915 may be a remote control mechanism (a so-called remote control) using, for example, infrared light or other radio waves, or may be an external connection device 929 such as a mobile phone or a PDA conforming to the operation of the information processing device 900. Furthermore, the input device 915 generates an input signal based on, for example, information which is input by a user with the above operation mechanism, and includes an input control circuit for outputting the input signal to the CPU 901. The user of the information processing device 900 can input various data to the information processing device 900 and can instruct the information processing device 900 to perform processing by operating the input device 915. Note that the input unit 310 described above with reference to FIG. 4 can be realized by, for example, the input device 915.

The output device 917 includes a device capable of visually or audibly notifying acquired information to a user. Examples of such device include display devices such as a CRT display device, a liquid crystal display device, a plasma display device, an EL display device and lamps, audio output devices such as a speaker and a headphone, a printer, and the like. For example, the output device 917 outputs a result obtained by various processes performed by the information processing device 900. More specifically, the display device displays, in the form of texts or images, a result obtained by various processes performed by the information processing device 900. On the other hand, the audio output device converts an audio signal including reproduced audio data and sound data into an analog signal, and outputs the analog signal. Note that the output unit 330 described above with reference to FIG. 6 can be realized by, for example, the output device 917.

The storage device 919 is a device for storing data configured as an example of a storage unit of the information processing device 900. The storage device 919 is configured from, for example, a magnetic storage device such as a HDD (Hard Disk Drive), a semiconductor storage device, an optical storage device, or a magneto-optical storage device. This storage device 919 stores programs to be executed by the CPU 901, and various data.

The drive 921 is a reader/writer for recording medium, and is embedded in the information processing device 900 or attached externally thereto. The drive 921 reads information recorded in the attached removable recording medium 927 such as a magnetic disk, an optical disc, a magneto-optical disk, or a semiconductor memory, and outputs the read information to the RAM 905. Furthermore, the drive 921 can write record in the attached removable recording medium 927 such as a magnetic disk, an optical disc, a magneto-optical disk, or a semiconductor memory. The removable recording medium 927 is, for example, a DVD medium, an HD-DVD medium, or a Blu-ray (a registered trademark) medium. In addition, the removable recording medium 927 may be a CompactFlash (CF; a registered trademark), a flash memory, an SD memory card (Secure Digital Memory Card), or the like. Alternatively, the removable recording medium 927 may be, for example, an IC card (Integrated Circuit Card) equipped with a non-contact IC chip or an electronic appliance.

The connection port 923 is a port for allowing devices to directly connect to the information processing device 900. Examples of the connection port 923 include a USB (Universal Serial Bus) port, an IEEE1394 port, a SCSI (Small Computer System Interface) port, and the like. Other examples of the connection port 923 include an RS-232C port, an optical audio terminal, an HDMI (a registered trademark) (High-Definition Multimedia Interface) port, and the like. By the external connection device 929 connecting to this connection port 923, the information processing device 900 directly obtains various types of data from the external connection device 929 and provides various types of data to the external connection device 929.

The communication device 925 is a communication interface including, for example, a communication device for connecting to a communication network 931. The communication device 925 is, for example, a wired or wireless LAN (Local Area Network), Bluetooth (registered trademark), a communication card for WUSB (Wireless USB), or the like. Alternatively, the communication device 925 may be a router for optical communication, a router for ADSL (Asymmetric Digital Subscriber Line), a modem for various communications, or the like. This communication device 925 can transmit and receive signals and the like in accordance with a predetermined protocol such as TCP/IP on the Internet and with other communication devices, for example. The communication network 931 connected to the communication device 925 includes a network and the like, which is connected via wire or wirelessly, and may be, for example, the Internet, a home LAN, infrared communication, radio wave communication, satellite communication, or the like.

Heretofore, an example of the hardware configuration capable of realizing the functions of the information processing device 900 included in the information processing system 1 according to the embodiment of the present disclosure has been shown. Each of the structural elements described above may be configured using a general-purpose material, or may be implemented by hardware dedicated to the function of each structural element. Accordingly, the hardware configuration to be used can be changed as appropriate according to the technical level at the time of carrying out the present embodiment. Note that, although not shown in FIG. 24, for example, it naturally includes various configurations corresponding to the information processing device 900 included in the information processing system 1 according to the present embodiment.

Note that it is also possible to develop a computer program for realizing the respective functions of the information processing device 900 included in the information processing system 1 according to the present embodiment as discussed above, and implement the computer program in a personal computer or the like. In addition, a computer-readable recording medium storing such a computer program may also be provided. The recording medium may be a magnetic disk, an optical disc, a magneto-optical disk, or flash memory, for example. Furthermore, the above computer program may also be delivered via a network, for example, without using a recording medium. In addition, the number of computers causing the computer program to be executed is not particularly limited. For example, the computer program may be executed in cooperation of a plurality of computers (e.g., a plurality of servers or the like). Note that a single computer or a plurality of cooperating computers is also referred to as "computer system."

5. APPLICATION EXAMPLES

Next, application examples of the information processing system according to the present embodiment will be described. The information processing system according to each embodiment of the present disclosure can be applied to a system and a device to which information is input via a voice. As a specific example, the information processing system according to the present embodiment can also be applied to information processing devices such as smartphones, tablet terminals, personal computers (PCs), and the like. In this case, for example, such an information processing device may be configured as the above-described input/output device 30 or a device including the input/output device 30 and the information processing device 10 in an integrated manner.

In addition, as another example, the information processing system according to the present embodiment may also be applied to an in-vehicle system such as a so-called car navigation system. In addition, the information processing system according to the present embodiment may also be applied to so-called smart home appliances.

In addition, the above-described application examples are merely examples, and examples to which the information processing system according to the present embodiment can be applied are not particularly limited as long as they are systems or devices to which information can be input through a voice.

The application examples of the information processing system according to the present embodiment have been described above.

6. CONCLUSION

The preferred embodiment (s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

an acquisition unit configured to acquire context information in a period for collection of a voice; and a control unit configured to cause a predetermined output unit to present a candidate for character information obtained by converting the voice in a mode in accordance with the context information.

(2)

The information processing device according to (1), in which the context information includes information regarding a state of an environment in which the voice is collected.

(3)

The information processing device according to (1), in which the context information includes information regarding a state of input information or an input situation of the input information.

(4)

The information processing device according to (1), in which the context information includes information regarding a mode of utterance of the voice.

(5)

The information processing device according to (4), in which the information regarding a mode of utterance is information regarding a speed of the utterance, and the control unit causes the output unit to present character information indicating pronunciation of the voice as the character information obtained by converting the voice in accordance with the speed of the utterance.

(6)

The information processing device according to (4), in which the information regarding a mode of utterance is information regarding a speed of the utterance, and the control unit limits a number of the candidates presented by the output unit in accordance with the speed of the utterance.

(7)

The information processing device according to (1), in which the context information includes information regarding a state of the user who has uttered the voice.

(8)

The information processing device according to any one of (1) to (7), in which the control unit controls levels of priority of at least some candidates among the one or more candidates of the character information obtained by converting the voice in accordance with the context information in the period for collection of the voice.

(9)

The information processing device according to (8), in which the context information includes information regarding an influence of noise, and the control unit controls the levels of priority in accordance with the levels of similarity based on pronunciation of the voice in a case in which the influence of the noise is less than a threshold value.

(10)

The information processing device according to (8), in which the context information includes information regarding an influence of noise, and the control unit controls the levels of priority in accordance with a co-occurrence relationship between a plurality of pieces of character information obtained by converting the voice in a case in which the influence of the noise is higher than a threshold value.

(11)

The information processing device according to (8), in which the control unit causes the output unit to present one or more candidates for the character information indicating pronunciation of the voice in accordance with an analysis result of sound that is the collected voice, and controls the levels of priority on a basis of a result of selection with respect to at least some of the presented one or more candidates indicating the pronunciation.

(12)

The information processing device according to (8), in which the control unit switches data referred to for controlling the levels of priority in accordance with the context information.

(13)

The information processing device according to (8), in which the control unit controls the levels of priority for each of a plurality of different algorithms on a basis of the algorithms in accordance with the context information, and causes the output unit to present the candidates for the character information for each of the algorithms in accordance with the levels of priority controlled on the basis of the algorithms.

(14)

The information processing device according to (13), in which the control unit presents the candidates for the character information in different modes for each of the algorithms.

(15)

The information processing device according to any one of (1) to (14), in which the control unit receives designation of a condition for the character information obtained by converting the voice and limits the candidates for the character information presented by the output unit on a basis of the condition.

(16)

The information processing device according to any one of (1) to (15), in which the control unit presents information indicating a number of the candidates for the character information obtained by converting the voice in association with the character information.

(17)

The information processing device according to any one of (1) to (16), in which the acquisition unit successively acquires a result of a voice recognition process executed on a basis of the successively collected voice, and the control unit causes the output unit to present one or more candidates for character information obtained by converting at least part of the voice of the collected voice on a basis of the successively acquired result of the voice recognition process.

(18)

An information processing device including:

a transmission unit configured to transmit context information in a period for collection of a voice acquired by a predetermined acquisition unit to an external device; and an output unit configured to present a candidate for character information obtained by converting the voice transmitted from an external device in a mode in accordance with the context information.

(19)

An information processing method including, by a computer system:

acquiring context information in a period for collection of a voice; and causing a predetermined output unit to present a candidate for character information obtained by converting the voice in a mode in accordance with the acquired context information.

(20)

An information processing method including, by a computer system:

transmitting context information in a period for collection of a voice acquired by a predetermined acquisition unit to an external device; and presenting a candidate for character information obtained by converting the voice transmitted from an external device in a mode in accordance with the context information.

REFERENCE SIGNS LIST 1, 2 information processing system
10 information processing device
101 voice recognition processing unit
103 context analysis unit
105 priority control unit
107 output control unit
20 information processing device
201 voice recognition processing unit
203 reliability calculation unit
205 output control unit
30 input/output device
310 input unit
311 sound collection unit
313 sensing unit
315 operation unit
330 output unit
331 display unit

The invention claimed is:

1. An information processing device comprising:

an acquisition unit configured to acquire context information in a period during which a voice is collected; and a control unit configured to cause a predetermined output unit to present a plurality of candidates for character information obtained by converting the voice in a mode in accordance with the context information, wherein the context information includes information regarding a mode of an utterance of the voice, wherein the information regarding the mode of the utterance of the voice includes a speed of the utterance of the voice, wherein the control unit limits a number of the plurality of candidates presented by the output unit in accordance with the speed of the utterance of the voice, and wherein the acquisition unit and the control unit are each implemented via at least one processor.

2. The information processing device according to claim 1, wherein the context information includes information regarding a state of an environment in which the voice is collected.

3. The information processing device according to claim 1, wherein the context information includes information regarding a state of input information or an input situation of the input information.

4. The information processing device according to claim 1, wherein the context information includes information regarding a state of a user who has uttered the voice.

5. The information processing device according to claim 1, wherein the control unit controls levels of priority among the plurality of candidates for the character information obtained by converting the voice in accordance with the context information acquired in the period.

6. The information processing device according to claim 5, wherein the context information includes information regarding an influence of noise, and the control unit controls the levels of priority in accordance with levels of similarity based on pronunciation of the voice in a case in which the influence of the noise is less than a threshold value.

7. The information processing device according to claim 5,
wherein the context information includes information regarding an influence of noise, and
the control unit controls the levels of priority in accordance with a co-occurrence relationship between a plurality of pieces of character information obtained by converting the voice in a case in which the influence of the noise is higher than a threshold value.

8. The information processing device according to claim 5,
wherein the control unit causes the output unit to present one or more candidates for character information indicating pronunciation of the voice in accordance with an analysis result of sound that is the collected voice, and controls the levels of priority on a basis of a result of selection with respect to at least some of the presented one or more candidates indicating the pronunciation.

9. The information processing device according to claim 5, wherein the control unit switches data referred to for controlling the levels of priority in accordance with the context information.

10. The information processing device according to claim 5,
wherein the control unit controls the levels of priority for each of a plurality of different algorithms on a basis of the algorithms in accordance with the context information, and
wherein the control unit causes the output unit to present the plurality of candidates for the character information for each of the algorithms in accordance with the levels of priority controlled on the basis of the algorithms.

11. The information processing device according to claim 10, wherein the control unit presents the plurality of candidates for the character information in different modes for each of the algorithms.

12. The information processing device according to claim 1,
wherein the control unit receives designation of a condition for the character information obtained by converting the voice and limits the plurality of candidates for the character information presented by the output unit on a basis of the condition.

13. The information processing device according to claim 1,
wherein the control unit presents information indicating a number of the plurality of candidates for the character information obtained by converting the voice in association with the character information.

14. The information processing device according to claim wherein the acquisition unit successively acquires a result of a voice recognition process executed on a basis of successively collected voice, and
the control unit causes the output unit to present the plurality of one or more candidates for character information obtained by converting at least part of the successively collected voice on a basis of the successively acquired result of the voice recognition process.

15. The information processing device according to claim 1, wherein the control unit further causes the output unit to present character information indicating pronunciation of the voice as the character information obtained by converting the voice in accordance with the context information.

16. An information processing device comprising:
a transmission unit configured to transmit context information to an external device in a period during which a voice is collected, wherein the context information is acquired by a predetermined acquisition unit; and
an output unit configured to present a plurality of candidates for character information obtained by converting the voice transmitted from the external device,
wherein the voice is converted in a mode in accordance with the context information,
wherein the context information includes information regarding a mode of an utterance of the voice,
wherein the information regarding the mode of the utterance of the voice includes a speed of the utterance of the voice,
wherein a number of the plurality of candidates presented by the output unit is limited in accordance with the speed of the utterance of the voice, and
wherein the transmission unit and the output unit are each implemented via at least one processor.

17. An information processing method comprising, by a computer system:
acquiring context information in a period during which a voice is collected; and
causing a predetermined output unit to present a plurality of candidates for character information obtained by converting the voice in a mode in accordance with the acquired context information,
wherein the context information includes information regarding a mode of an utterance of the voice,
wherein the information regarding the mode of the utterance of the voice includes a speed of the utterance of the voice, and
wherein a number of the presented plurality of candidates is limited in accordance with the speed of the utterance of the voice.

18. An information processing method comprising, by a computer system:
transmitting context information to an external device in a period during which a voice is collected, wherein the context information is acquired by a predetermined acquisition unit; and
presenting a plurality of candidates for character information obtained by converting the voice transmitted from the external device,
wherein the voice is converted in a mode in accordance with the context information,
wherein the context information includes information regarding a mode of an utterance of the voice,
wherein the information regarding the mode of the utterance of the voice includes a speed of the utterance of the voice, and
wherein a number of the presented plurality of candidates is limited in accordance with the speed of the utterance of the voice.

* * * * *